(12) United States Patent
Higgins et al.

(10) Patent No.: US 8,704,847 B2
(45) Date of Patent: Apr. 22, 2014

(54) PRE-SUBPIXEL RENDERED IMAGE PROCESSING IN DISPLAY SYSTEMS

(75) Inventors: Michael Francis Higgins, Cazadero, CA (US); Seok Jin Han, Cupertino, CA (US); Candice Hellen Brown Elliott, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 1068 days.

(21) Appl. No.: 11/910,649

(22) PCT Filed: Apr. 4, 2006

(86) PCT No.: PCT/US2006/012521
§ 371 (c)(1),
(2), (4) Date: Oct. 4, 2007

(87) PCT Pub. No.: WO2006/107979
PCT Pub. Date: Oct. 12, 2006

(65) Prior Publication Data
US 2008/0186325 A1    Aug. 7, 2008

Related U.S. Application Data

(60) Provisional application No. 60/743,940, filed on Mar. 29, 2006, provisional application No. 60/668,578, filed on Apr. 4, 2005.

(51) Int. Cl.
*G09G 5/02* (2006.01)

(52) U.S. Cl.
USPC ............. 345/591; 345/76; 345/77; 345/82; 345/83; 345/87; 345/613; 345/696; 345/55

(58) Field of Classification Search
USPC ............ 345/591, 613, 694–695, 698, 76–77, 345/82–83, 87–88, 55
See application file for complete search history.

(56) References Cited

U.S. PATENT DOCUMENTS

| | | | |
|---|---|---|---|
| 5,767,860 A | 6/1998 | Zimmer et al. | |
| 6,188,385 B1 * | 2/2001 | Hill et al. | 345/614 |
| 6,225,973 B1 * | 5/2001 | Hill et al. | 345/589 |
| 6,396,505 B1 | 5/2002 | Lui et al. | |
| 6,535,614 B1 * | 3/2003 | Kimura et al. | 382/100 |

(Continued)

FOREIGN PATENT DOCUMENTS

| | | |
|---|---|---|
| CN | 001539129 A | 10/2004 |
| TW | 578117 | 3/2004 |

(Continued)

*Primary Examiner* — Jason Mandeville
(74) *Attorney, Agent, or Firm* — Innovation Counsel LLP

(57) ABSTRACT

Display systems and image processing methods process pre-subpixel rendered images embedded in input color image data. The display systems include a pre-subpixel rendered (P-SPR) image detector that detects locations of a marking code that marks the portion of the input data that has been pre-subpixel rendered and which is ready for direct display. Several display system embodiments comprise first and second image data paths; the input data that requires subpixel rendering proceeds along the first path while the P-SPR image data proceeds along the second path. Another display system embodiment processes the combined input and P-SPR data along a single data path. Techniques for marking and detecting P-SPR image data using two distinct marking codes are presented in the context of the subpixel layout of the display. Techniques for using P-SPR data to display high-quality graphical symbols (e.g., font glyphs) are suitable for small, low-cost display devices.

28 Claims, 21 Drawing Sheets

(56) References Cited

U.S. PATENT DOCUMENTS

| | | |
|---|---|---|
| 6,717,622 B2 | 4/2004 | Lan |
| 6,738,526 B1 | 5/2004 | Betrisey et al. |
| 6,933,952 B2 * | 8/2005 | Frisken et al. ............... 345/611 |
| 7,123,277 B2 * | 10/2006 | Brown Elliott et al. ...... 345/690 |
| 7,352,374 B2 * | 4/2008 | Brown Elliott et al. ...... 345/613 |
| 7,598,963 B2 * | 10/2009 | Brown Elliott et al. ...... 345/589 |
| 7,646,430 B2 * | 1/2010 | Brown Elliott et al. ...... 348/458 |
| 8,031,205 B2 * | 10/2011 | Brown Elliott et al. ...... 345/613 |
| 2001/0048764 A1 * | 12/2001 | Betrisey et al. ............... 382/162 |
| 2003/0085906 A1 * | 5/2003 | Elliott et al. .................. 345/613 |
| 2003/0103058 A1 * | 6/2003 | Brown Elliott et al. ...... 345/589 |
| 2004/0196297 A1 * | 10/2004 | Elliott et al. .................. 345/613 |
| 2007/0109331 A1 * | 5/2007 | Brown Elliott et al. ...... 345/694 |

FOREIGN PATENT DOCUMENTS

| | | |
|---|---|---|
| TW | 200416621 A | 9/2004 |
| TW | 1229842 B | 3/2005 |
| TW | 200509058 A | 3/2005 |

\* cited by examiner

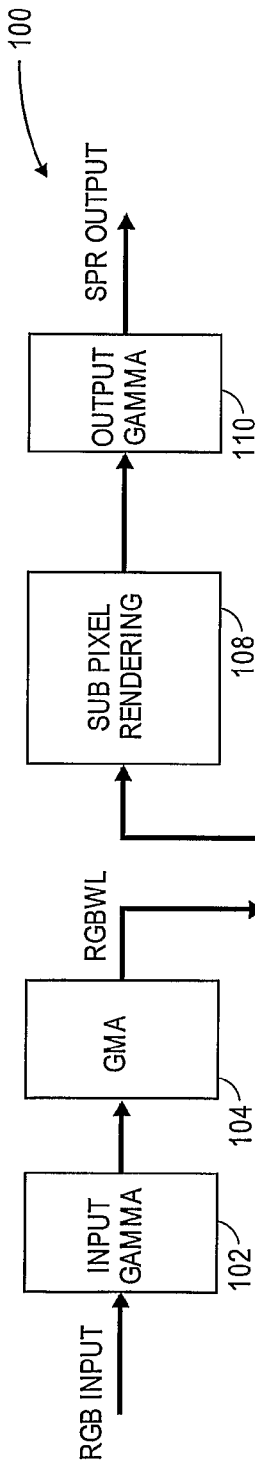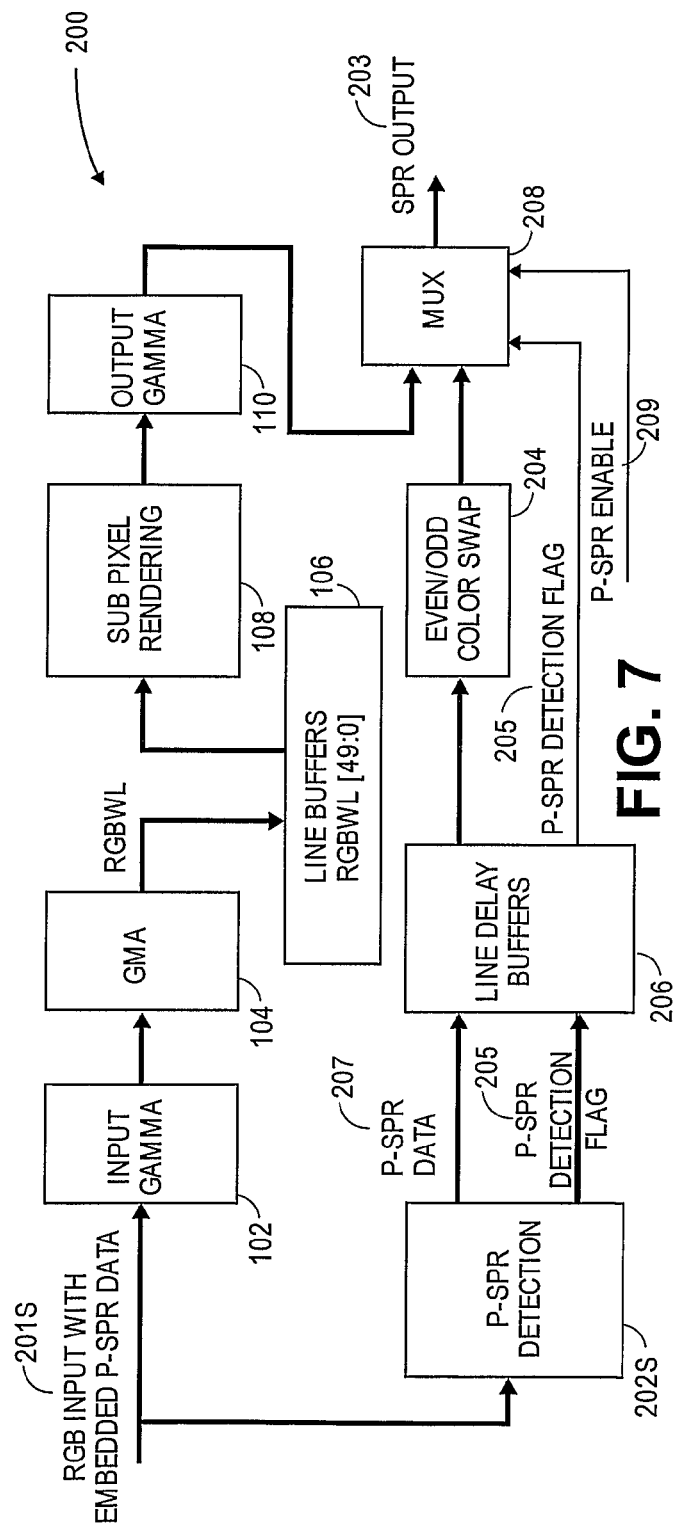

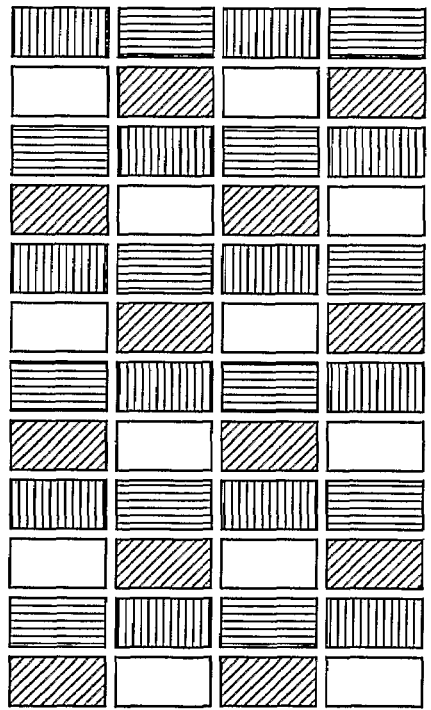
FIG. 19A
FIG. 19B
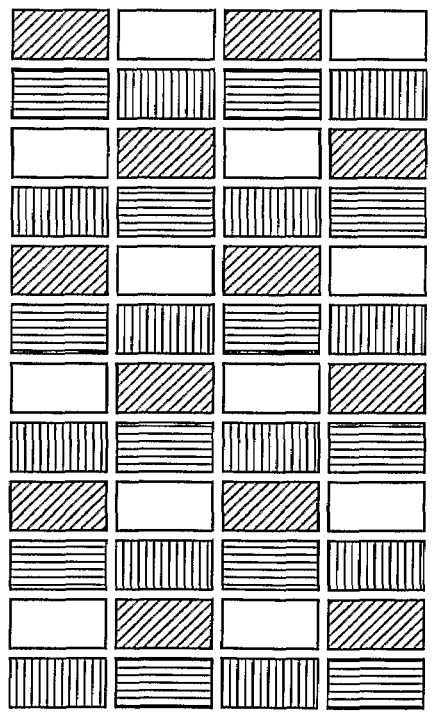
FIG. 20A
FIG. 20B

PRE-SUBPIXEL RENDERED IMAGE PROCESSING IN DISPLAY SYSTEMS

CROSS REFERENCE TO RELATED APPLICATIONS

This application claims the benefit of U.S. Provisional Application No. 60/668,578 entitled IMPROVED METHODS AND SYSTEMS FOR BY-PASSING SUBPIXEL RENDERING IN DISPLAY SYSTEMS, filed on Apr. 4, 2005, and U.S. Provisional Application No. 60/743,940 entitled PRE-SUBPIXEL RENDERED IMAGE PROCESSING IN DISPLAY SYSTEMS, filed on Mar. 29, 2006 are hereby incorporated by reference herein in its entirety.

The following co-owned applications are related to the present application and are hereby incorporated by reference herein: (1) U.S. Patent Application Ser. No. 60/668,510 entitled "EFFICIENT MEMORY STRUCTURE FOR DISPLAY SYSTEM WITH NOVEL SUBPIXEL STRUCTURES"; (2) U.S. Patent Application Ser. No. 60/668,511 entitled "SYSTEMS AND METHODS FOR IMPLEMENTING LOW-COST GAMUT MAPPING ALGORITHMS"; and (3) U.S. Patent Application Ser. No. 60/668,512 entitled "SYSTEMS AND METHODS FOR IMPLEMENTING IMPROVED GAMUT MAPPING ALGORITHMS."

TECHNICAL FIELD

The present application relates to various embodiments of display systems and methods for processing images having embedded pre-subpixel rendered images therein.

BACKGROUND

In commonly owned United States Patents and Patent Applications including: (1) U.S. Pat. No. 6,903,754 ("the '754 Patent") entitled "ARRANGEMENT OF COLOR PIXELS FOR FULL COLOR IMAGING DEVICES WITH SIMPLIFIED ADDRESSING;" (2) United States Patent Publication No. 2003/0128225 ("the '225 application") having application Ser. No. 10/278,353 and entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Patent Publication No. 2003/0128179 ("the '179 application") having application Ser. No. 10/278,352 and entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) United States Patent Publication No. 2004/0051724 ("the '724 application") having application Ser. No. 10/243,094 and entitled "IMPROVED FOUR COLOR ARRANGEMENTS AND EMITTERS FOR SUB-PIXEL RENDERING," filed Sep. 13, 2002; (5) United States Patent Publication No. 2003/0117423 ("the '423 application") having application Ser. No. 10/278,328 and entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Patent Publication No. 2003/0090581 ("the '581 application") having application Ser. No. 10/278,393 and entitled "COLOR DISPLAY HAVING HORIZONTAL SUB-PIXEL ARRANGEMENTS AND LAYOUTS," filed Oct. 22, 2002; and (7) United States Patent Publication No. 2004/0080479 ("the '479 application") having application Ser. No. 10/347,001 and entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, novel sub-pixel arrangements are disclosed for improving the cost/performance curves for image display devices. Each of the aforementioned '225, '179, '724, '423, '581, and '479 published applications and U.S. Pat. No. 6,903,754 are hereby incorporated by reference herein in its entirety.

For certain subpixel repeating groups having an even number of subpixels in a horizontal direction, systems and techniques to affect improvements, e.g. proper dot inversion schemes and other improvements, are disclosed in the following commonly owned United States patent documents: (1) United States Patent Publication No. 2004/0246280 ("the '280 application") having application Ser. No. 10/456,839 and entitled "IMAGE DEGRADATION CORRECTION IN NOVEL LIQUID CRYSTAL DISPLAYS"; (2) United States Patent Publication No. 2004/0246213 ("the '213 application") (U.S. patent application Ser. No. 10/455,925) entitled "DISPLAY PANEL HAVING CROSSOVER CONNECTIONS EFFECTING DOT INVERSION"; (3) United States Patent Publication No. 2004/0246381 ("the '381 application") having application Ser. No. 10/455,931 and entitled "SYSTEM AND METHOD OF PERFORMING DOT INVERSION WITH STANDARD DRIVERS AND BACKPLANE ON NOVEL DISPLAY PANEL LAYOUTS"; (4) United States Patent Publication No. 2004/0246278 ("the '278 application") having application Ser. No. 10/455,927 and entitled "SYSTEM AND METHOD FOR COMPENSATING FOR VISUAL EFFECTS UPON PANELS HAVING FIXED PATTERN NOISE WITH REDUCED QUANTIZATION ERROR"; (5) United States Patent Publication No. 2004/0246279 ("the '279 application") having application Ser. No. 10/456,806 entitled "DOT INVERSION ON NOVEL DISPLAY PANEL LAYOUTS WITH EXTRA DRIVERS"; (6) United States Patent Publication No. 2004/0246404 ("the '404 application") having application Ser. No. 10/456,838 and entitled "LIQUID CRYSTAL DISPLAY BACKPLANE LAYOUTS AND ADDRESSING FOR NON-STANDARD SUBPIXEL ARRANGEMENTS"; (7) United States Patent Publication No. 2005/0083277 ("the '277 application") having application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) United States Patent Publication No. 2005/0212741 ("the '741 application") having application Ser. No. 10/807,604 and entitled "IMPROVED TRANSISTOR BACKPLANES FOR LIQUID CRYSTAL DISPLAYS COMPRISING DIFFERENT SIZED SUBPIXELS", filed Mar. 23, 2004. Each of the aforementioned '280, '213, '381, '278, '404, '277 and '741 published applications are hereby incorporated by reference herein in its entirety.

These improvements are particularly pronounced when coupled with sub-pixel rendering (SPR) systems and methods further disclosed in the above-referenced U.S. Patent documents and in commonly owned United States Patents and Patent Applications: (1) United States Patent Publication No. 2003/0034992 ("the '992 application") having application Ser. No. 10/051,612 and entitled "CONVERSION OF A SUB-PIXEL FORMAT DATA TO ANOTHER SUB-PIXEL DATA FORMAT," filed Jan. 16, 2002; (2) United States Patent Publication No. 2003/0103058 ("the '058 application") having application Ser. No. 10/150,355 entitled "METHODS AND SYSTEMS FOR SUB-PIXEL RENDERING WITH GAMMA ADJUSTMENT," filed May 17, 2002; (3) United States Patent Publication No. 2003/0085906 ("the '906 application") having application Ser. No. 10/215,843 and entitled "METHODS AND SYSTEMS FOR SUBPIXEL RENDERING WITH ADAPTIVE FILTERING," filed Aug. 8, 2002; (4) United States Publication No. 2004/0196302 ("the '302 application") having application Ser. No. 10/379,767 and entitled "SYSTEMS AND METHODS FOR TEMPORAL SUB-PIXEL RENDERING OF IMAGE DATA" filed Mar. 4, 2003; (5) United States Patent Publication No. 2004/0174380 ("the '380 application") having application Ser. No. 10/379,765 and entitled "SYSTEMS AND METHODS FOR MOTION ADAPTIVE FILTERING," filed Mar. 4, 2003; (6) U.S. Pat. No. 6,917,368 ("the '368 Patent") entitled "SUB-PIXEL RENDERING SYSTEM AND METHOD FOR IMPROVED DISPLAY VIEWING ANGLES"; and (7) United States Patent Publication No. 2004/0196297 ("the '297 application") having application Ser. No. 10/409,413 and entitled "IMAGE DATA SET WITH EMBEDDED PRE-SUBPIXEL RENDERED IMAGE" filed Apr. 7, 2003. Each of the aforementioned '992, '058, '906, '302, 380 and '297 applications and the '368 patent are hereby incorporated by reference herein in its entirety.

Improvements in gamut conversion and mapping are disclosed in commonly owned United States Patents and co-pending United States Patent Applications: (1) U.S. Pat. No. 6,980,219 ("the '219 Patent") entitled "HUE ANGLE CALCULATION SYSTEM AND METHODS"; (2) United States Patent Publication No. 2005/0083341 ("the '341 application") having application Ser. No. 10/691,377 and entitled "METHOD AND APPARATUS FOR CONVERTING FROM SOURCE COLOR SPACE TO RGBW TARGET COLOR SPACE", filed Oct. 21, 2003; (3) United States Patent Publication No. 2005/0083352 ("the '352 application") having application Ser. No. 10/691,396 and entitled "METHOD AND APPARATUS FOR CONVERTING FROM A SOURCE COLOR SPACE TO A TARGET COLOR SPACE", filed Oct. 21, 2003; and (4) United States Patent Publication No. 2005/0083344 ("the '344 application") having application Ser. No. 10/690,716 and entitled "GAMUT CONVERSION SYSTEM AND METHODS" filed Oct. 21, 2003. Each of the aforementioned '341, '352 and '344 applications and the '219 patent is hereby incorporated by reference herein in its entirety.

Additional advantages have been described in (1) United States Patent Publication No. 2005/0099540 ("the '540 application") having application Ser. No. 10/696,235 and entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; and in (2) United States Patent Publication No. 2005/0088385 ("the '385 application") having application Ser. No. 10/696,026 and entitled "SYSTEM AND METHOD FOR PERFORMING IMAGE RECONSTRUCTION AND SUB-PIXEL RENDERING TO EFFECT SCALING FOR MULTI-MODE DISPLAY" filed Oct. 28, 2003, each of which is hereby incorporated herein by reference in its entirety.

Additionally, each of these co-owned and co-pending applications is herein incorporated by reference in its entirety: (1) United States Patent Publication No. 2005/0225548 ("the '548 application") having application Ser. No. 10/821,387 and entitled "SYSTEM AND METHOD FOR IMPROVING SUB-PIXEL RENDERING OF IMAGE DATA IN NON-STRIPED DISPLAY SYSTEMS"; (2) United States Patent Publication No. 2005/0225561 ("the '561 application") having application Ser. No. 10/821,386 and entitled "SYSTEMS AND METHODS FOR SELECTING A WHITE POINT FOR IMAGE DISPLAYS"; (3) United States Patent Publication No. 2005/0225574 ("the '574 application") and United States Patent Publication No. 2005/0225575 ("the '575 application") having application Ser. Nos. 10/821,353 and 10/961,506 respectively, and both entitled "NOVEL SUBPIXEL LAYOUTS AND ARRANGEMENTS FOR HIGH BRIGHTNESS DISPLAYS"; (4) United States Patent Publication No. 2005/0225562 ("the '562 application") having application Ser. No. 10/821,306 and entitled "SYSTEMS AND METHODS FOR IMPROVED GAMUT MAPPING FROM ONE IMAGE DATA SET TO ANOTHER"; (5) United States Patent Publication No. 2005/0225563 ("the '563 application") having application Ser. No. 10/821,388 and entitled "IMPROVED SUBPIXEL RENDERING FILTERS FOR HIGH BRIGHTNESS SUBPIXEL LAYOUTS"; and (6) United States Patent Publication No. 2005/0276502 ("the '502 application") having application Ser. No. 10/866,447 and entitled "INCREASING GAMMA ACCURACY IN QUANTIZED DISPLAY SYSTEMS."

DISCLOSURE OF THE INVENTION

Technical Effect: The various embodiments of the display systems illustrated and described below have the technical effect of distinguishing pre-subpixel rendered image data from image data that should be subpixel rendered prior to display when both kinds of image data are present in the same input image data stream. The various embodiments of the image processing methods for processing pre-subpixel rendered image data illustrated and described below have the technical effect of displaying a high quality pre-subpixel rendered image of a graphical symbol in a foreground color over a background color.

A display device having a display panel configured with a subpixel layout comprises input circuitry for receiving input image data including an image data subset indicating a plurality of pre-subpixel rendered image data values in conformance with, and ready for display on, the subpixel layout of the display panel. The display device further comprises a pre-subpixel rendering detection component for detecting an input image location of each of the plurality of pre-subpixel rendered image data values, and a subpixel rendering component for performing a subpixel rendering operation on the input image data to produce subpixel rendered image data values in conformance with, and ready for display on, the subpixel layout of the display panel. The display device further comprises an output data selection component for selecting an output color data value for each output location on the display panel. The output data selection component selects one of the subpixel rendered image data value and the pre-subpixel rendered image data value according to the input image locations detected by the pre-subpixel rendering detection component.

An image processing method is disclosed for rendering characters in a font onto a display device having a subpixel layout and capable of detecting pre-subpixel rendered image data. The method comprises performing a subpixel rendering operation on image data values representing each character in the font to produce pre-subpixel rendered glyph image data indicating a glyph ready for display on the display device, and marking the pre-subpixel rendered glyph image data with a marking code to produce marked pre-subpixel rendered glyph image data. The marking code distinguishes the pre-subpixel rendered glyph image data from image data that has not been subpixel rendered. The method further comprises storing the marked pre-subpixel rendered graphical symbol image data in a memory device, and, in response to a signal requesting display of a character in the font, outputting the marked pre-subpixel rendered glyph image data indicating the character to the display device.

An image processing method for displaying a pre-subpixel rendered glyph stored in a memory device as a density map of pixels each indicating density values specifying a mixing percentage of each of a foreground color and a background color; the method comprising: receiving an input signal to display the pre-subpixel rendered glyph; retrieving the pre-subpixel rendered glyph from the memory device; for each pixel of the pre-subpixel rendered glyph, combining the mixing percentages of an input foreground color value and an input background color value according to the density values stored in the density map to produce color image data values indicating a blended color glyph; correcting the color image data values indicating the blended color glyph for output gamma; and outputting the gamma-corrected blended color glyph directly to a display device without further subpixel rendering.

BRIEF DESCRIPTION OF THE DRAWINGS

The organization and methods of operation of the image processing systems and techniques are best understood from the following description of several illustrated embodiments when read in connection with the accompanying drawings wherein the same reference numbers are used throughout the drawings to refer to the same or like parts.

FIG. 5 is a block diagram illustrating the functional components of a display system that includes a subpixel rendering operation.

FIG. 7 is a block diagram of an embodiment of a display system including a pre-subpixel rendered image detection component and showing a data path for processing pre-subpixel rendered image data that utilizes a separate delay memory.

FIGS. 13A and 13B respectively illustrate a first subpixel layout and a schematic representation of an image data set including embedded pre-subpixel rendered image data marked with an embodiment of a suitable color key.

FIGS. 15A and 15B respectively illustrate a third subpixel layout and a schematic representation of an image data set including embedded pre-subpixel rendered image data marked with an embodiment of a suitable color key.

FIGS. 16A and 16B respectively illustrate a fourth subpixel layout and a schematic representation of an image data set including embedded pre-subpixel rendered image data marked with a first embodiment of a suitable color key.

FIGS. 19A and 19B respectively illustrate a second variation of the fourth subpixel layout of FIG. 16A and a suitably paired repeating group of embedded pre-subpixel rendered image data marked with an embodiment of a suitable color key.

FIGS. 20A and 20B respectively illustrate a third variation of the fourth subpixel layout of FIG. 16A and a suitably paired repeating group of embedded pre-subpixel rendered image data marked with an embodiment of a suitable color key.

MODES FOR CARRYING OUT THE INVENTION

Figure 1:
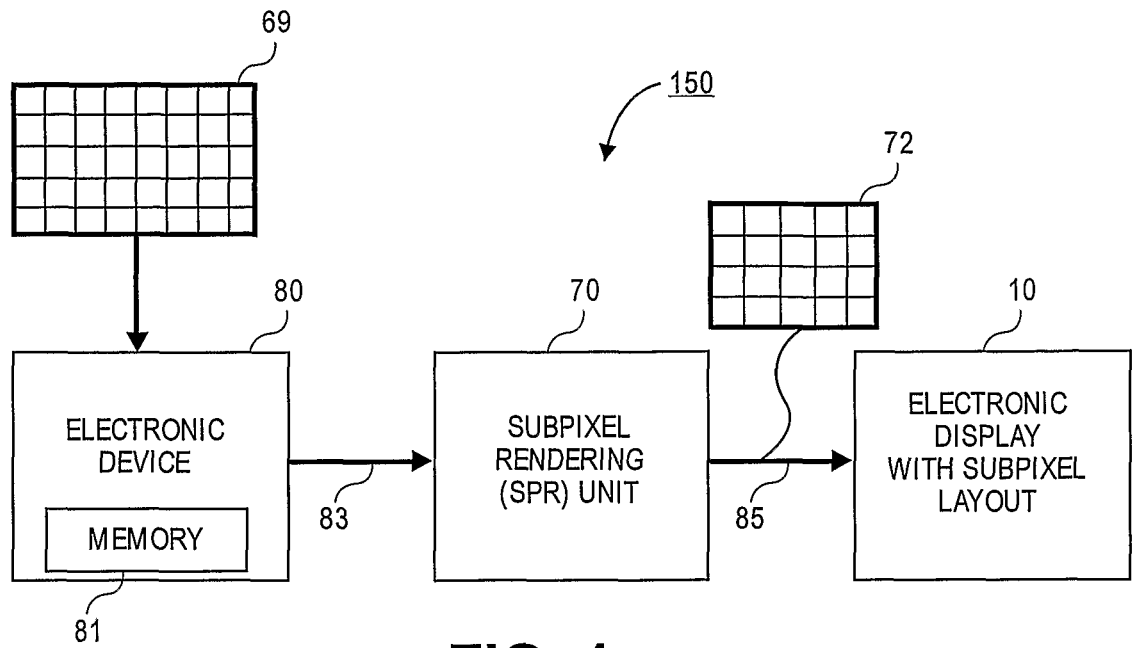
FIG. 1 is a block diagram of an electronic device that includes a subpixel rendering capability for displaying subpixel rendered images.

FIG. 1 is a block diagram of display system 150 that performs subpixel rendering of image data set 69 for an electronic display 10 that employs subpixel layouts such as those disclosed in some of the above-referenced published patent applications, including, for example, in the '992 and '575 applications. Electronic device 80 may generate image data set 69, or it may receive image data set 69 from another source, or electronic device 80 may extract image data set 69 from memory medium 81. Examples of electronic device 80 include a computer, television receiver, video player, digital cell phone, or other like electronic device that may output an image for display. Examples of memory medium 81 include any of magnetic tape, Random Access Memory (RAM), Read Only Memory (ROM), Compact Disc (CD), Digital Video Disc (DVD), flexible magnetic disc ("floppy"), Hard magnetic Drive (HD), or any other suitable memory medium.

With continued reference to FIG. 1, image data set 69 is delivered via data path 83 to subpixel rendering (SPR) unit 70. Subpixel rendering (SPR) unit 70 includes a combination of hardware and/or software suitable for implementing subpixel rendering techniques described in various ones of the above-mentioned U.S. Application Publications, such as, for example, in the '058 and '906 applications.

The result of the subpixel rendering operation performed by SPR unit 70 is image data set 72 which is delivered by data path 85 to electronic display 10 for producing the resulting image thereon. For display system 150 where SPR unit 70 is included with electronic display 10, data path 85 is included in the electronics in display 10. Other implementations of display system 150 may provide for other configurations of data path 85. For example, data path 85 may include a digital video interface (DVI) transmitter/receiver pair between a computer and a flat panel display monitor, and would also include electronic circuitry in the flat panel display. Still other configurations of data path 85 include an analog transmitter/receiver pair between a computer and a flat panel display monitor, which would also include electronics in the flat panel display. Analog systems are commonly used to drive analog Cathode Ray Tube (CRT) monitors. Recently, Liquid Crystal Display monitors have used analog-to-digital (D/A) converters to allow it to receive and display analog signals.

Figure 2:
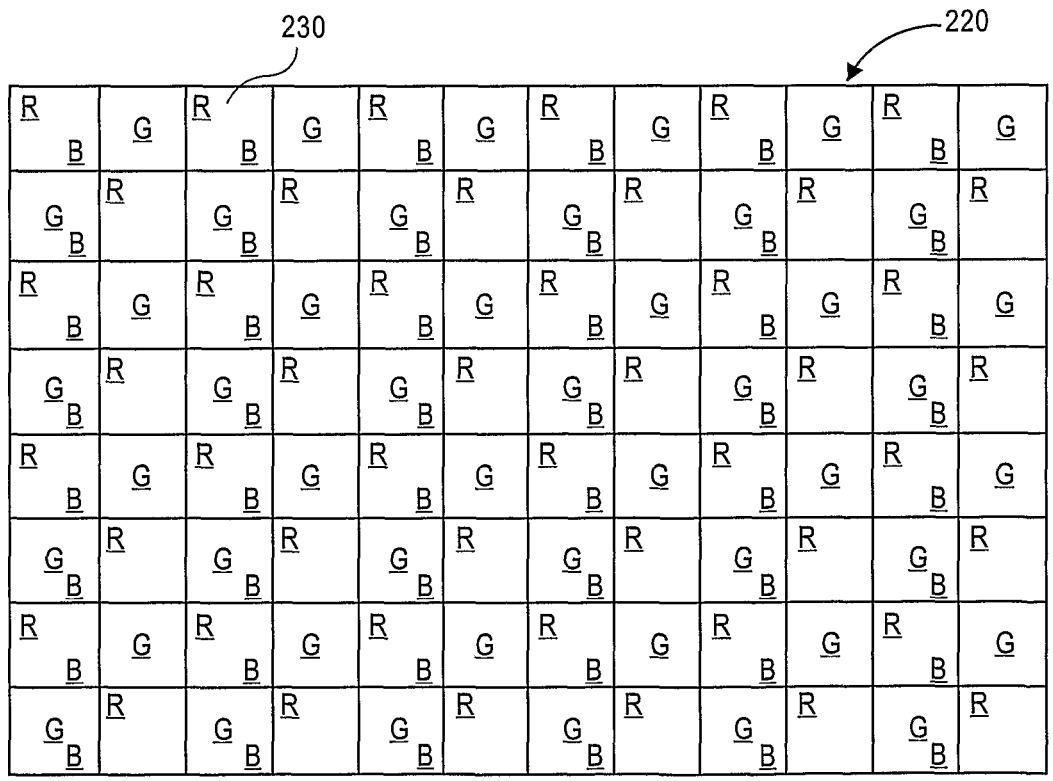
FIG. 2 illustrates an example of an image data set produced by the subpixel rendering operation shown in FIG. 1.

FIG. 2 illustrates image data set 220 which is an example of image data set 72 of FIG. 1, produced according to one embodiment of subpixel rendering unit 70. Other examples of image data set 72 are provided in various ones of the above-referenced U.S. Patent Application Publications. FIG. 2 shows data values for rendering red, green and blue subpixels, shown in FIG. 2 as R, G and B, on display 10 with subpixel layout. Note that FIG. 2 shows the R, G and B subpixel data values positioned in a sample order that corresponds to a particular subpixel layout (not shown) on display 10 which allows for direct distribution to the column drivers of display 10. In general, display 10 would typically require the R, G and B subpixel data values to be positioned in a sample order that corresponds to its subpixel layout. However, as noted in the '297 application, the sample order of the R, G and B subpixel data values of image data set 220 may be arranged so as to facilitate input to other processes, such as compression operations, and then restored to the column-driver sample order needed by a particular display.

With continued reference to FIG. 2, the R, G and B subpixel data values are illustrated in positions relative to an original data set (not shown) comprised of conventional red, green and blue (RGB) data values presented as triplets in bounded areas, where each triplet indicates a color for display. In image data set 220, there are "missing points" from the original data set. For example, bounded area 230, which could be interpreted to represent a "pixel" in an image, contains data values for "red" (shown as R) and "blue" (shown as B) but is missing the data value for "green." This is because the subpixel rendering techniques employed in display system 100 typically produce an image data set of fewer binary bits than contained in input image data set 69.

Figure 3:
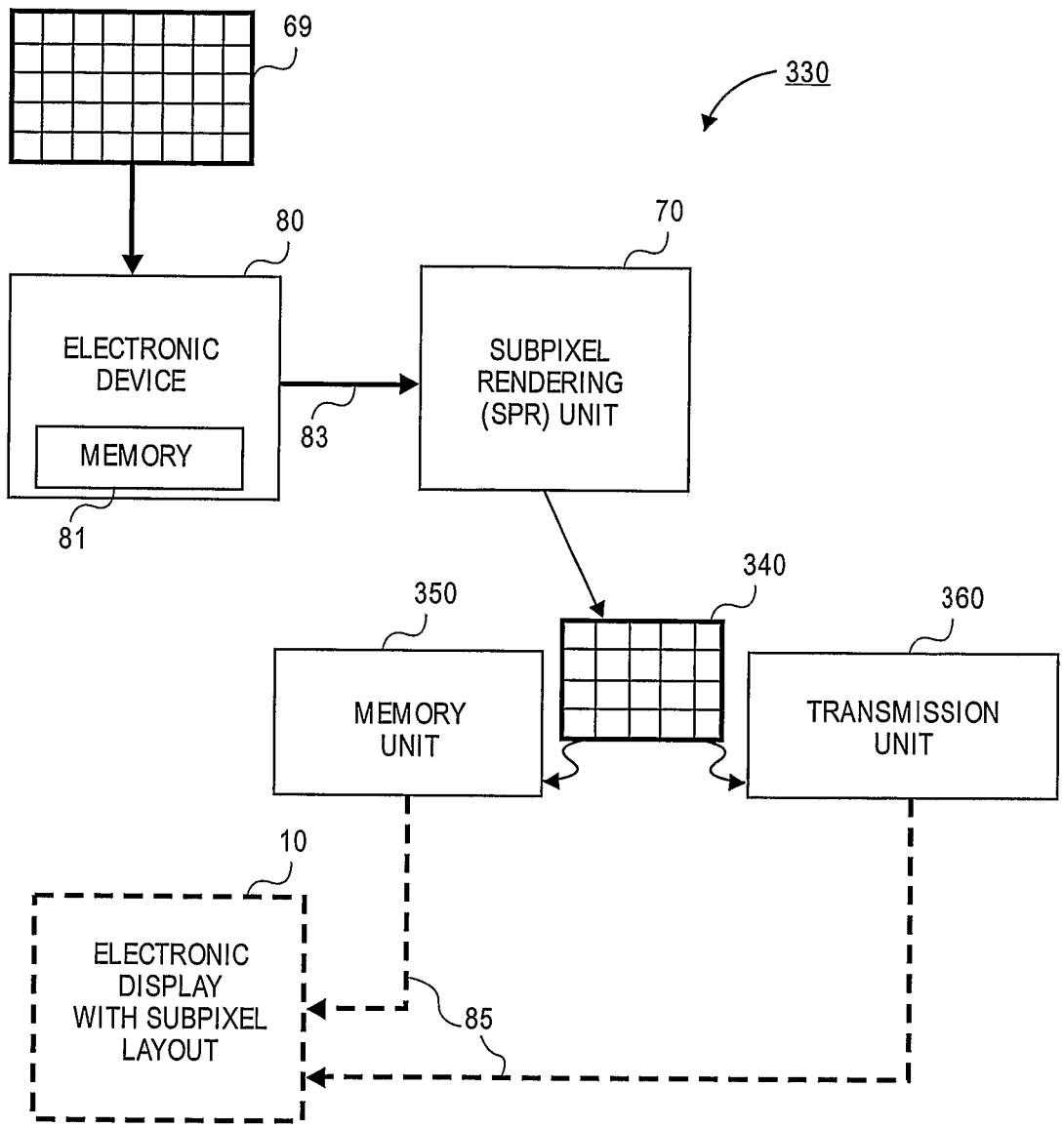
FIG. 3 is a block diagram of an electronic device that includes a subpixel rendering capability and that may store or transmit a subpixel rendered image data set.

FIG. 3 is a block diagram of display system 330 that also performs subpixel rendering of image data set 69 for an electronic display 10 that employs subpixel layouts. Image data set 69 is delivered via data path 83 to subpixel rendering (SPR) unit 70. As described with respect to FIG. 1, subpixel rendering (SPR) unit 70 includes a combination of hardware and/or software suitable for implementing subpixel rendering techniques described in various ones of the above-mentioned U.S. Patent Application Publications. The result of the subpixel rendering operation performed by SPR unit 70 is image data set 340. Image data set 340 may be similar, or identical, to image data set 72 produced by SPR unit 70 of display system 150 illustrated in FIG. 3, but, in contrast to display system 150, image data set 340 is stored in a memory unit 350, for delivery by data path 85 to electronic display 10 for producing the resulting image thereon. Alternatively, image data set 340 is provided to transmission unit 360, for delivery by data path 85. Memory unit 350 or transmission unit 360 may be included with SPR unit 70 or may be a separate component. Data path 85 and electronic display 10 are shown in dashed lines to indicate that these components may not necessarily be an integral part of display system 330. For purposes of the discussion herein, image data set 340 is referred to as a "pre-subpixel rendered image." Pre-subpixel rendered (P-SPR) image data is image data that has been processed by a subpixel rendering operation and stored or transmitted prior to display.

United States Patent Application Publication. 2004/0196297 A1, entitled "IMAGE DATA SET WITH EMBEDDED PRE-SUBPIXEL RENDERED IMAGE (hereafter the '297 application) and published on Oct. 7, 2004, discloses various image processing techniques for producing and displaying a pre-subpixel rendered image. The pre-subpixel rendered image can be transmitted directly to a display, such as display 10 of FIG. 1 or 3, capable of displaying a subpixel rendered image. The pre-subpixel rendered image can also be stored for later transmission and output to a display. One advantage of storing and transmitting a pre-subpixel rendered image is that the display device may be made less expensive by not including an SPR unit. For example, a plurality of devices, of which there are many in use in a distributed system, may receive images that have been pre-subpixel rendered from a single source. Another advantage comes from the discussion above wherein pre-subpixel rendered data contains fewer binary bits than the original input data set. Thus a pre-subpixel rendered data set will require less memory to store and less bandwidth to transmit.

The '297 application further discloses various techniques for embedding the pre-subpixel rendered image into, and for extracting the pre-subpixel rendered image from, an image data set. So, for example, in the block diagram of FIG. 4, input image data set 69 may be input to a functional unit, called a pre-subpixel rendering unit 440 in FIG. 4, that has the capability of generating a pre-subpixel rendered image 460 of a portion of input image data set 69 and to embed pre-subpixel rendered image 460 into image data set 450.

Figure 4:
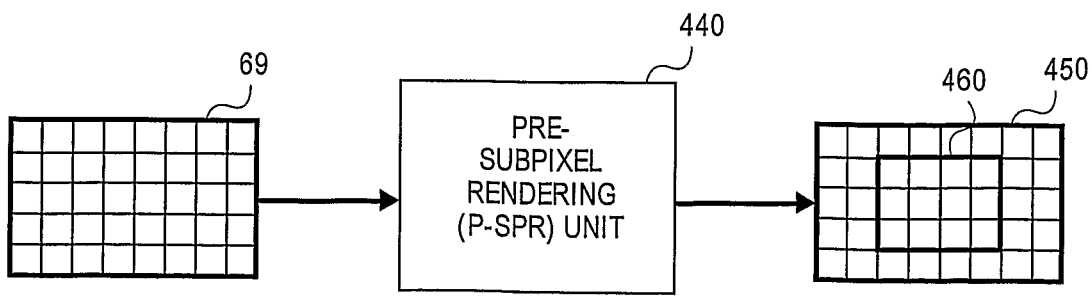
FIG. 4 is a block diagram of a pre-subpixel rendering unit that produces a pre-subpixel rendered image embedded in an image data set.

FIG. 13B shows image data set 1300, which is an example of image data set 450 of FIG. 4, that includes pre-subpixel rendered image 1320. Image data set 1300 may be thought of as including two image data subsets: pre-subpixel rendered image 1320 and the remaining portion of the input image data set 1300 that does not comprise pre-subpixel rendered image data. Pre-subpixel rendered image 1320 may be thought of as including two data sets: one data set comprises the color values, expressed in the figure as instances of R, G and B, that, when rendered on a display, produce the image represented by pre-subpixel rendered image 1320.

A second data set included in pre-subpixel rendered image 1320 comprises a marking code for marking pre-subpixel rendered image 1320. In FIG. 13B, the marking code is a set of data values "65," "27" and "207" that collectively represent a color key used for marking the extent of the R, G and B data values to identify which data values in image data set 1300 are part of a pre-subpixel rendered image. As discussed in the '297 application, the color key may be selected to avoid or minimize any distortion of the output image if the output image were to be rendered on a display that did not include a capability for detecting the portion of input image data set 1300 that comprises pre-subpixel rendered image 1320. The discussion in the '297 application notes that there may be other techniques for marking the extent of the R, G and B data values to identify them as being part of a pre-subpixel rendered image, and identifies these techniques collectively as being analogous to image processing techniques known in the art as "watermarking."

Generally, then, either the pre-subpixel rendered image 1320 or the remaining portion of image data set 1300 that forms the conventional image data set may have embedded therein a marking code, also referred to as a "watermark," that a subpixel rendering system and/or algorithm is capable of recognizing or decoding. When the subpixel rendering system detects the presence of the watermark, it knows that a subset of the image is a pre-subpixel rendered image that may be extracted and displayed with no further processing. The watermark thus described may take advantage of techniques in the field of steganography for hiding data in an image data set such that the data modification is perceptually indistinguishable to a human viewer when the image data set is rendered, but the hidden data is capable of being decoded by a machine.

The remaining data in image data set 1300 is comprised of color values expressed as conventional R, G, B data triplets (shown in the figure without any underlining to distinguish them from the pre-subpixel rendered data) that may be representative of input image data set 69 of FIG. 1. When an image data set such as image data set 1300 is provided to display system 150 of FIG. 1, the portion of image data set 1300 that comprises pre-subpixel rendered image 1320, once identified as such, need not be processed by SPR unit 70 and may be directly ready for display on electronic display 10 or provided to other processing units. The '297 application further discloses various techniques for detecting image data in an input image data set, such as image data set 1300, that comprises a pre-subpixel rendered image.

FIG. 5 illustrates the functional components of a display system 100 that includes a subpixel rendering operation. Data flow through display system 100 is shown by the heavy lines with arrows. For purposes of the discussions that follow, the data path for the RGB input data shown in system 100 that includes input gamma operation 102, GMA operation 104, line buffers 106, SPR operation 108 and output gamma operation 110 is referenced below as the "SPR data path." Each of these known operations will now be briefly described in turn. Additional information about this display system embodiment may be found in several of the above-referenced patent application publications. See, for example, United States Patent Publication No. 2005/0083352. In some of these related applications, the SPR data path is referenced as a "gamut pipeline" or a "gamma pipeline."

Input circuitry provides RGB input data or other input data formats to system 100. The RGB input data may then be input to Input Gamma operation 102. Output from operation 102 then proceeds to Gamut Mapping operation 104 (labeled as GMA in FIG. 5). Typically, Gamut Mapping operation 104 accepts image data and performs any necessary or desired gamut mapping operation upon the input data. For example, if the image processing system is inputting RGB input data for rendering upon a RGBW display panel, then a mapping operation may be desirable in order to use the white (W) primary of the display. This operation might also be desirable in any general multiprimary display system where input data is going from one color space to another color space with a different number of primaries in the output color space. Additionally, a GMA might be used to handle situations where input color data might be considered as "out of gamut" in the output display space. In display systems that do not perform such a gamut mapping conversion, GMA operation 104 is omitted.

With continued reference to FIG. 5, intermediate image data output from Gamut Mapping operation 104 is stored in line buffers 106. Line buffers 106 supply subpixel rendering (SPR) operation 108 with the image data needed for further processing at the time the data is needed. For example, an SPR that implements an area resampling scheme (as disclosed in some of the aforementioned patent applications) typically may employ a 3×3 matrix of image data surrounding a given image data point in question in order to perform area resampling. Thus, three data lines are input into SPR 108 to perform a subpixel rendering operation that may involve neighborhood filtering steps. After SPR operation 108, image data may be subject to an output Gamma operation 110 before being output from the system to a display.

Note that, when an image data set such as image data set 1300 of FIG. 13B is provided to display system 100 of FIG. 5, the portion of image data set 1300 that comprises pre-subpixel rendered image 1320 is processed in the same manner as the input RGB data, and the advantages of using pre-subpixel rendered image data are not realized. In fact, if pre-subpixel rendered image data 1320 is processed in the same manner as the input RGB data, image distortion will occur. In order to realize the advantages of using pre-subpixel rendered image data, such data, once identified, is directly ready for display or may be provided to other processing units, and may bypass processing by an SPR operation and/or a GMA operation.

In addition, in one of the embodiments disclosed in the '297 application for detecting a pre-subpixel rendered image embedded in an image data set, it is noted that pixels that contain pre-subpixel rendered image data marked with a color key that occur at the boundary between the conventional RGB data and the pre-subpixel rendered image data may generate invalid color values for an SPR operation processing the conventional RGB color data for subpixel rendering. The '297 application discloses a technique for exchanging, or swapping, certain color values in alternating (for example, even/odd) pairs of marked input pixels. In certain implementations, such "swapping" may make the SPR hardware easier to design by removing any need for special detection or recovery for pixels just outside the marked pre-subpixel rendered image area.

Figure 6:
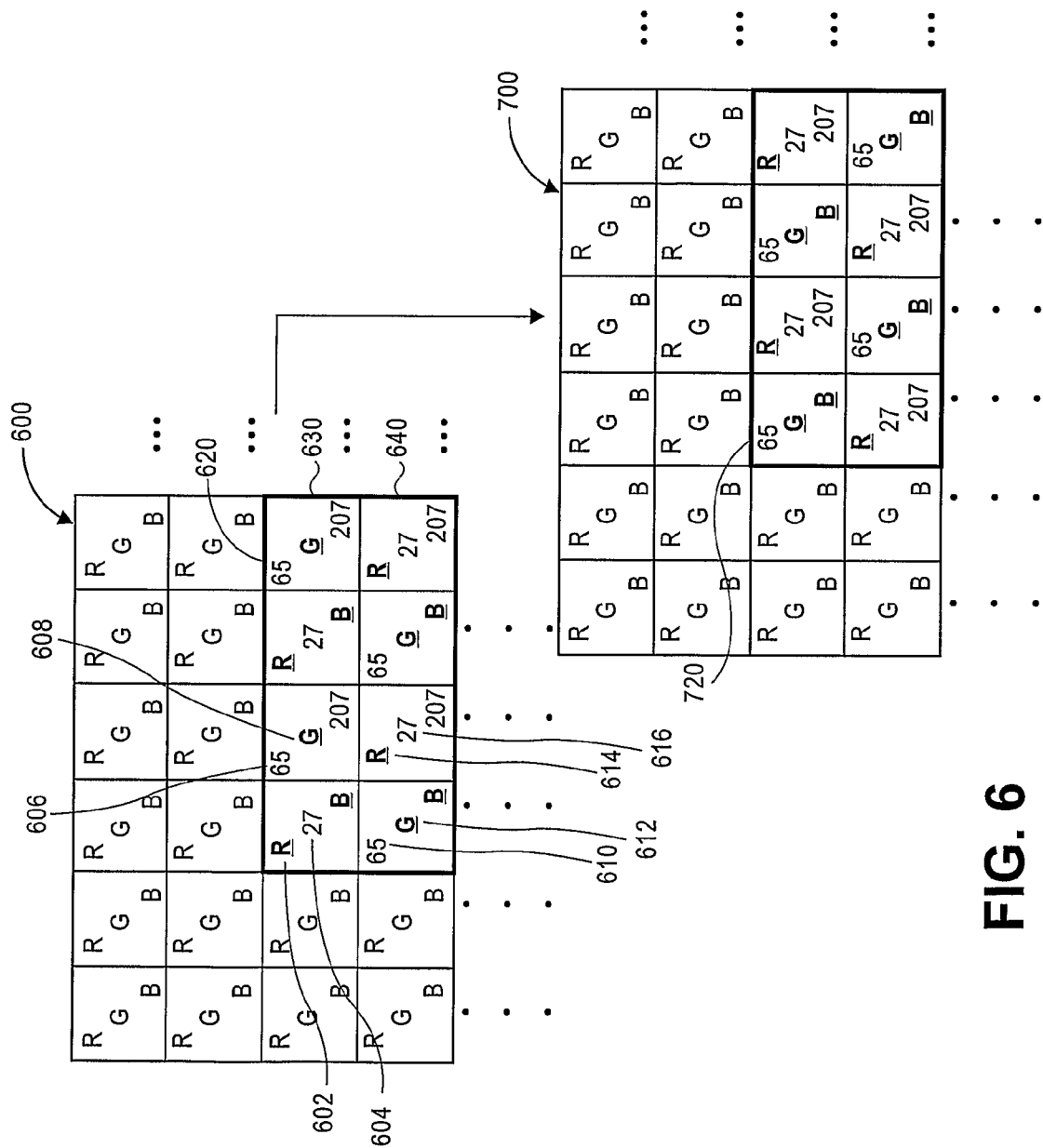
FIG. 6 illustrates a data exchanging, or swapping, operation that exchanges color data values with color key values in a marked pre-subpixel rendered image.

FIG. 6 illustrates a swapping operation. FIG. 6 shows a portion of input image data set 600 which includes pre-subpixel rendered image 620, only a portion of which is shown in the figure. Pre-subpixel rendered image 620 includes color values R, G and B, shown in the figure as bolded and underlined to distinguish the pre-subpixel rendered data from input image data that is to be input to a subpixel rendering operation prior to display. Color key (65, 27, 207) is the marking code that has been used to mark the color data values that are part of the pre-subpixel rendered image. The color data values can be referenced by their row and column locations within the image data set. For purposes of this discussion, the image data set is designated to start in the upper left of the image at location (0, 0). In pre-subpixel rendered data area 620, it can be seen that "R" data values 602 alternate with color key value "65" denoted by reference numeral 606 in even rows 630 in pre-subpixel rendered image 620 and color key value "65" denoted by reference numeral 610 alternates with "R" data values 614 in odd rows 640. FIG. 6 also shows color key value "27" denoted by reference numeral 604 alternating with "G" data values 608 in even rows 630 and "G" data values 612 alternating with color key value "27" denoted by reference numeral 616 in odd rows 640.

With continued reference to FIG. 6, in even rows 630 of pre-subpixel rendered image data 620, the swapping operation swaps "R" data values 602 with color key value "65" denoted by reference numeral 606 and swaps color key value "27" denoted by reference numeral 604 with "G" data values 608. In odd rows 640 of pre-subpixel rendered image data 620, the swapping operation exchanges color key value "65" denoted by reference numeral 610 with "R" data values 614, and exchanges "G" data values 612 alternating with color key value "27" denoted by reference numeral 616. The result of the data swapping operation is image data set 700 with re-subpixel rendered image data 720.

The '297 application also discusses examples of types of images that may be suitable for pre-subpixel rendering. One such example relates to the imaging of characters in various fonts. Pre-subpixel rendering techniques may be used to produce an image data set including a high resolution representation of the "idealized" or outline version of a character in a particular font. These pre-rendered image data sets representing characters may be stored and embedded in an input image data set for use as needed. The reader is referred to the '297 application for farther information on this process.

The remainder of this detailed description now turns to discussions of three general areas related to pre-subpixel rendering. The first of these concerns implementations of display systems that process pre-subpixel rendered image data embedded in an input image data set. The second discussion concerns embodiments of appropriate color keys for marking pre-subpixel rendered image data in various situations, and additional methods for detecting a pre-subpixel rendered portion of an image data set. The third discussion focuses on the handling of pre-rendered character glyphs. Designing a separate data path (e.g., a bypass mechanism) for handling pre-subpixel rendered image data of display system 100 may take into account how the input RGB data is handled, such as, for example, the order in which the RGB data is processed, and delay times that may be introduced by SPR operation 108. For example, RGB data values that are to be subpixel rendered may have to go through a series of line buffers and may not come out until several line-times later. In some systems, if pixels marked as having been pre-subpixel rendered are to bypass SPR operation 108, they may have to be identified and stored for this time period in order to reach a final display operation with the input data that is subpixel rendered in SPR operation 108.

Processing a Pre-Subpixel Rendered Image for Display

FIG. 7 illustrates an embodiment of a display system that employs detection of pre-subpixel rendered image data that has been embedded in conventional RGB image data. Display system 200 takes, as input image data, conventional RGB data with embedded pre-subpixel rendered image data that has been marked with a detectable code that differentiates a section or area of input image data that has been pre-subpixel rendered. In FIGS. 7-10, the pre-subpixel rendered image data is referred to as "P-SPR" data for convenience. The P-SPR data in this embodiment utilizes a data swapping technique, such as the technique shown in FIG. 6; the RGB input with P-SPR data is labeled with reference numeral 201S to signify that the P-SPR data includes swapped data; other embodiments show RGB input with P-SPR data labeled with reference numeral 201 to signify that the P-SPR data does not include swapped data. Examples of P-SPR data marked with color key data and including exchanged, or swapped, data values, suitable for input to display system 200 are shown, for example, in any of FIGS. 13B, 14B, 15B and 16B, or as shown in the portions of pre-subpixel rendered data in any of FIGS. 17A, 18B, 19B and 20B.

System 200 in FIG. 7 shows the SPR data path for the RGB input with P-SPR data 201S that includes input gamma operation 102, GMA operation 104, line buffers 106, SPR operation 108 and output gamma operation 110. System 200 also shows a second data path for input data 201S that includes P-SPR detection operation 202S which identifies the color data values of input data 201S that represent pre-subpixel rendered image data that may be directly displayed without being input to SPR operation 108. This second data path may be hereafter referred to as the "P-SPR data path."

In FIG. 7, the P-SPR detection operation is labeled with reference numeral 202S to signify that the operation is capable of detecting P-SPR data that includes swapped data; other embodiments elsewhere in this description show P-SPR detection operation labeled with reference numeral 202 to signify that the P-SPR data does not include swapped data and P-SPR detection operation does not need to test for it. P-SPR detection operation 202S examines input image color data values to detect the color key, or other code, used to mark the portion of input data 201S that represents the pre-subpixel rendered image data. For each input color value in an image location, P-SPR detection operation 202S sets the value of a P-SPR detection flag 205 to signal the presence or absence of pre-subpixel rendered image data at that location.

P-SPR detection operation 202S may be designed to detect a specific color key as marking the extent and locations of the P-SPR data. P-SPR detection operation 202S may also be designed to accept color key data values from associated display registers to provide flexibility in accepting P-SPR data from different sources. For example, as discussed more fully below, color key data values may be optimally selected for marking P-SPR data on the basis of the bit depth representation of the color data, as shown in, and discussed with respect to, Table 1 below, in which case data values from Table 1 may be loaded in to associated display registers for use by P-SPR detection operation 202S. An example of the operation of P-SPR detection operation 202S is described in more detail below.

With continued reference to FIG. 7, the RGB input data with embedded P-SPR data 201S that has been examined by P-SPR detection operation 202S for the location of P-SPR data is labeled in FIG. 7 as P-SPR data 207. Because there is a delay in input data 201S introduced by line buffers 106, the P-SPR data 207, as well as the P-SPR detection flags 205, must be delayed by a similar amount. This delay is accomplished by buffering P-SPR data 207 in line delay buffers 206 while input RGB and P-SPR data 201S proceeding along the SPR data path completes processing. Prior to being output with the subpixel rendered image data from the SPR data path, P-SPR data 207 is input to color swap operation 204, where pre-subpixel rendered color values that were swapped with color key values when the pre-subpixel rendered data was originally embedded in input data 201S are exchanged back to their original positions in the data stream to ensure that proper color values are output in each pixel location on the output display.

The swapped data that is the output of operation 204, along with P-SPR enable signal 209, are input to selection operation 208, denoted as "MUX" 208 in FIG. 7, along with the data produced along the SPR data path. P-SPR enable signal 209 operates as a switch to turn P-SPR detection on and off, to further add flexibility to the operation of the display. At this point, input data 201S, which may represent both conventional RGB data and P-SPR data, have proceeded along the SPR data path, and only the conventional RGB data that emerges from this path contain valid color data values for display or further processing. When P-SPR enable signal 209 is "ON," selection operation 208 selects, for each output pixel location on the basis of the value of P-SPR detection flag 205, between the image data coming from the SPR data path and the pre-subpixel rendered data coming from block 204 to produce SPR Output data 203 for display of the image or presentation of output data 203 to further processing operations.

The embodiment illustrated in FIG. 7 shows that processing of pre-subpixel rendered data does not include the input gamma 102 and output gamma 108 operations, since only data that is to be subpixel rendered in SPR block 108 includes those processing steps. However, those of skill in the art will appreciate that the data paths illustrated in FIG. 7 could be modified to send the P-SPR portion of input data 201 through the input gamma 102 and output gamma 108 operations as well. The embodiment illustrated in FIG. 7 also illustrates a display system that includes GMA operation 104 for transforming input RGB data into data specified in a RGBW color space plus separate luminance or luminosity (L) data. Note that in some contexts, luminance may also be referred to as a Y value. More information about this transform and the calculation of luminance for use in the display systems illustrated herein may be found in US Patent Application Publication No. 2005/0083352. It is to be understood that color space transforms or changes to out-of-gamut colors are illustrated only by way of example, and in display systems that do not perform such a gamut mapping conversion, GMA operation 104 may be omitted.

Figure 8:
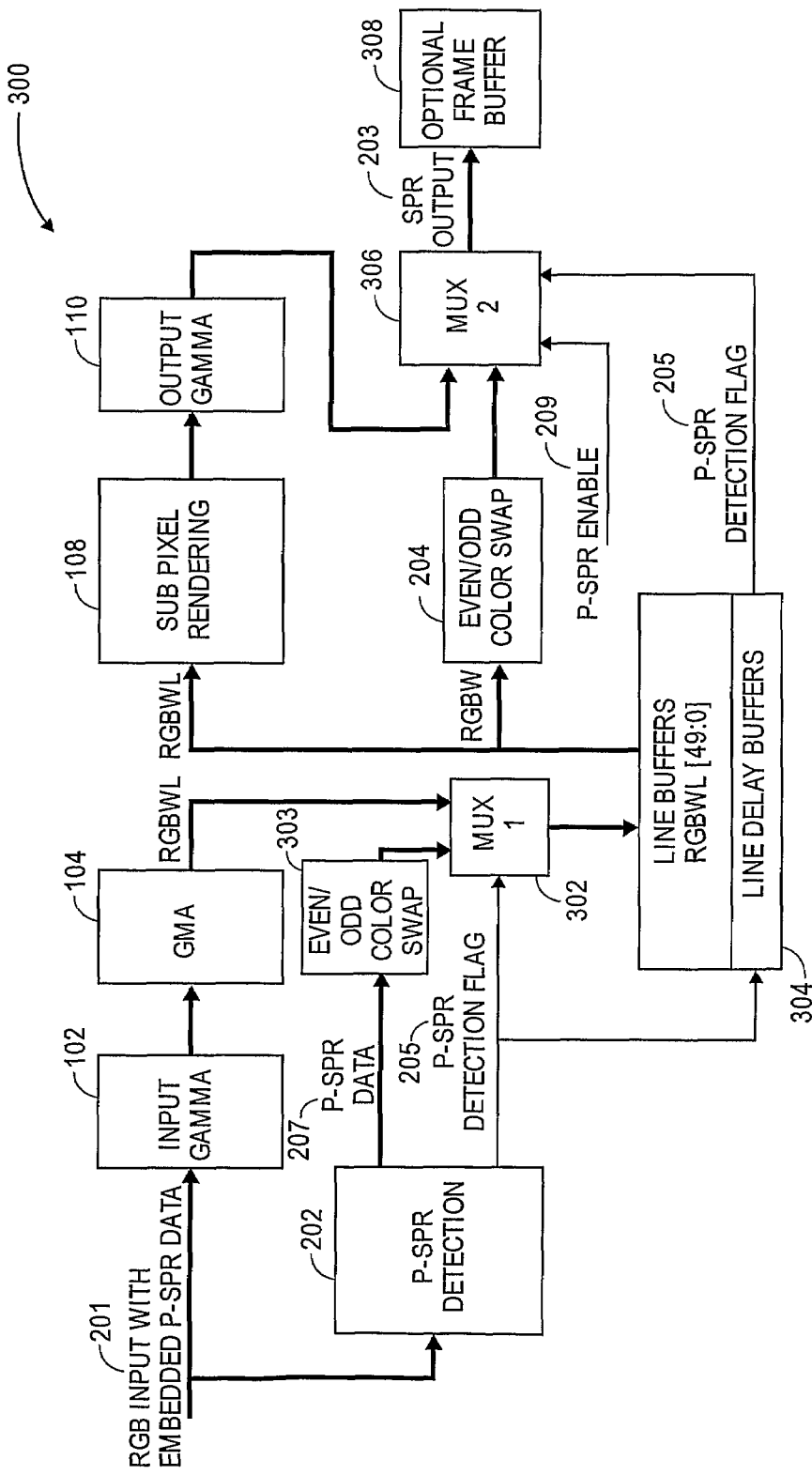
FIG. 8 is a block diagram of another embodiment of a display system including a pre-subpixel rendered image detection component and showing a data path for processing pre-subpixel rendered image data that utilizes a shared memory.

FIG. 8 illustrates another embodiment of a display system that employs detection of pre-subpixel rendered image data that has been embedded in conventional RGB image data. Display system 300 takes, as input image data, conventional RGB data with embedded pre-subpixel rendered image data that has been marked with a detectable code that differentiates a section or area of input image data that has been pre-subpixel rendered.

A feature of the display system illustrated in FIG. 8 is that it accepts input color data in which the embedded pre-subpixel rendered color data does not include color key data swapping. This means that the source producer of the input color data does not need to provide "swapped" data. Thus, the pre-subpixel rendered image data may be marked with color key data as discussed and shown in the '297 application, or as shown, for example, in the P-SPR image portion 1324 of FIG. 13A or FIG. 17B which show the P-SPR data marked with color key values with no data swapping, or in any other suitable manner. Distinctions between the embodiments shown in FIGS. 7 and 8 include (1) the pre-subpixel rendered data in the embodiment of FIG. 8 does not require data swapping in the input data 201, such as the technique shown in FIG. 6; this is illustrated in the figure by labeling the RGB and P-SPR data with reference numeral 201 and P-SPR detection operation with reference numeral 202, to distinguish these elements from the similar elements in FIG. 7; (2) the color data and color key swapping is done in even/odd swap modules 203 and 303; and (3) FIG. 8 provides an implementation for detecting pre-subpixel rendered image data that allows RGB and P-SPR data 201 to share SPR line buffers 304. In order to allow sharing of the SPR line buffers 304, either the color values output from GMA operation 104 or the color values indicating pre-subpixel rendered image data output from P-SPR detection operation 202 must be flagged to differentiate one set of data from the other. FIG. 8 shows an implementation in which the pre-subpixel rendered image data output from P-SPR detection operation 202 are flagged.

Display system 300 of FIG. 8 shows the same SPR data path as shown in the display system 200 of FIG. 7, but with the addition of selection operation 302, denoted as "MUX1" in FIG. 8 prior to storing input data proceeding along the SPR data path in line buffers 304. Input gamma operation 102 and gamut mapping operation 104 produce intermediate color data having invalid color values for the P-SPR input data that has proceeded along this path, and so these data should not be stored. Selection operation 302 serves the function of ensuring that valid color data that is to be processed by SPR operation 108 is stored in line buffers 304 by selecting between the RGB component data that is output from GMA operation 104 and P-SPR data 207 that is being processed along the second P-SPR data path. RGB input and P-SPR data 201 that is processed along the P-SPR data path are first processed by P-SPR detection operation 202 to detect the color key, or other code, used to mark the portion of input data 201 that represents the pre-subpixel rendered image data. For each input color value in an image location, P-SPR detection operation 202 sets the value of a P-SPR detection flag 205 to signal the presence or absence of pre-subpixel rendered image data at that location, and produces P-SPR data 207.

With continued reference to FIG. 8, P-SPR data 207 proceeds to color swap operation 303 to perform the data exchange operation described above in conjunction with FIG. 6. As noted above, the P-SPR data embedded in input RGB and P-SPR data 201 does not include any swapping of the color key data values that are used for marking purposes. However, as also noted above, the color key data values in the P-SPR data that are located on the boundary of the RGB input data may adversely affect the output of SPR operation 108 for those boundary RGB data, and the swapping operation described above in conjunction with FIG. 6 and in the '297 application prevents these adverse affects. Thus, display system 300 of FIG. 8 is designed to perform the data swapping operation before the data is stored in line buffers 304 and subsequently input to SPR operation 108. P-SPR data 207 that has proceeded through color swap operation 303 along with P-SPR detection flags 205 are input to selection operation 302 along with the data that has proceeded along the SPR data path through GMA operation 104. Selection operation 302 selects GMA output color values or P-SPR color values for storage in line buffer 304 according to the value of P-SPR detection flag 205, with each P-SPR color value being stored with P-SPR detection flag 205 in the line delay buffer of SPR buffer 304.

With continued reference to FIG. 8, line buffer output data, including P-SPR detection flag 205, proceed along the two SPR and P-SPR data paths to complete processing of the two types of data. Line buffers 304 provide color data values to SPR operation 108 for subpixel rendering, and subpixel rendered data that is output from SPR operation 108 proceeds through output gamma operation 110. Line buffers 304 also provide color data values to color swap operation 204 on the P-SPR data path. Color swap operation 204 reverses the data swapping of color key values that took place in color swap operation 303, to prepare the P-SPR data for proper output to the display. Data output from Output gamma operation 110 and from color swap operation 204 proceed to select operation 306, denoted as "MUX2" in FIG. 8. When the P-SPR function is enabled, as denoted by P-SPR enable signal 209, selection operation 306 selects between output gamma color values and P-SPR color values according to the value of P-SPR detection flag 205 to produce SPR output data 203.

As noted above with respect to the embodiment illustrated in FIG. 7, the data paths illustrated in FIG. 8 could be modified to send the P-SPR portion of input data 201 through the input gamma 102 and output gamma 108 operations as well. It is also to be understood that the data paths illustrated in FIG. 8 could be modified to omit GMA operation 104 in display systems that do not perform color space transforms or changes to out-of-gamut colors.

Figure 9:
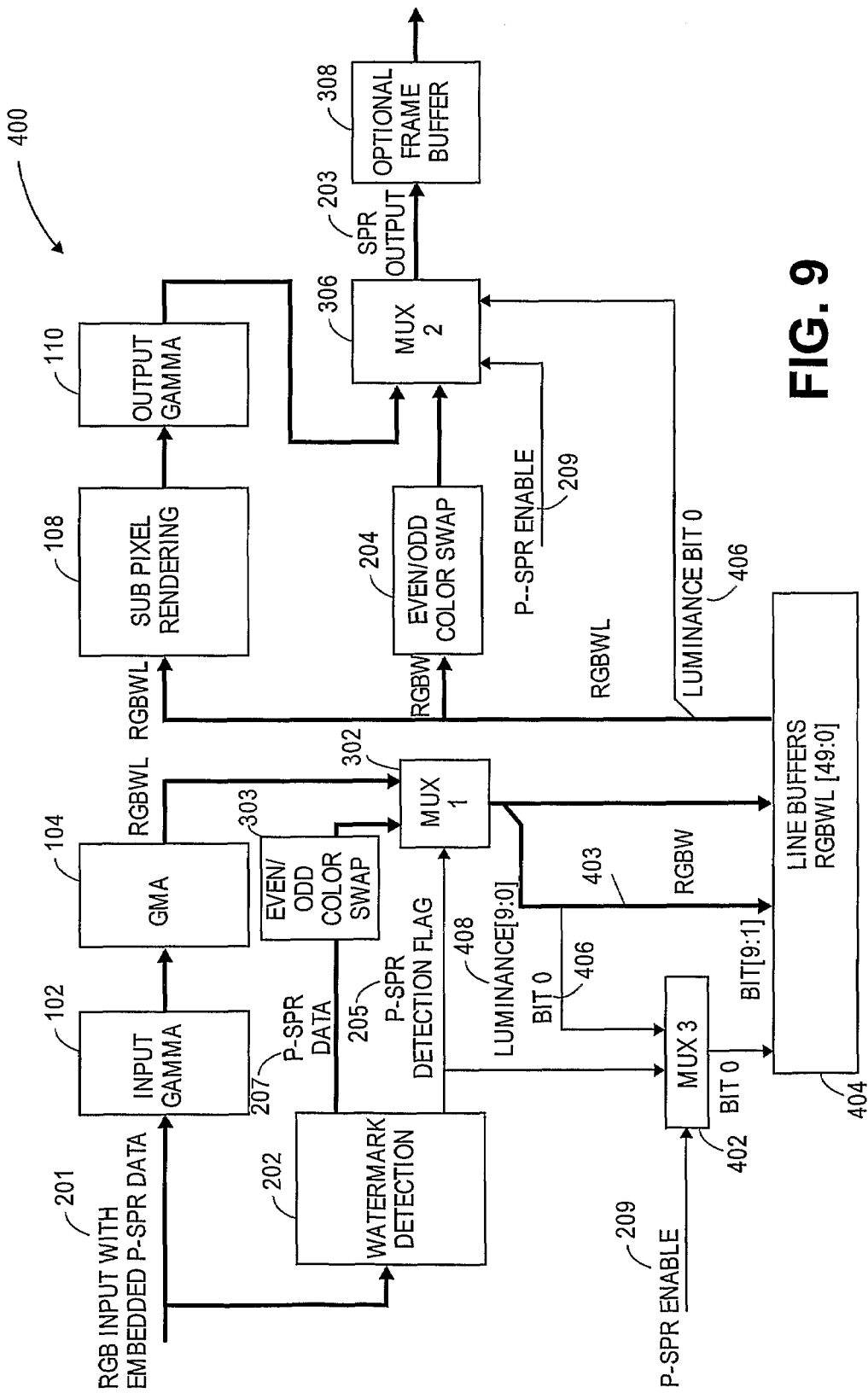
FIG. 9 is a block diagram of an embodiment of the display system of FIG. 8 in which a flag indicating a pre-subpixel rendered image color value is stored in a portion of a luminosity value, L, in a display that processes RGBWL image data.

FIG. 9 illustrates display system 400 which provides another implementation for detecting and handling pre-subpixel rendered image data. As noted above, GMA operation 104 converts input RGB data to color data represented in an RGBW or other color space. GMA operation 104 may also produces a separate luminance, or luminosity, value for each input RGB triplet and passes this luminance value L to SPR operation 108. The luminance value, L, is represented by a certain number, n, of bits of data. When n−1 bits of data resolution is sufficient for purposes of SPR operation 108, and produces an image that is perceptually acceptable to the viewer of the display—that is, the output image quality is as perceptually acceptable when using n−1 bits of luminance data as it is when using n bits of luminance data—then display system 400 uses one bit of the luminance value L to store P-SPR detection flag 205, and specific memory dedicated for the purpose of storing P-SPR detection flag 205 is not required.

The data paths of display system 400 shown in FIG. 9 illustrate modifications to the data paths shown in the implementation of display system 300 of FIG. 8, and handle input RGB with embedded P-SPR data 201 in which no data swapping has occurred in the P-SPR data. Specifically, display system 400 provides circuitry and processing for using one of the bits of luminance value L to carry P-SPR detection flag 205 for color data values that have been identified as presubpixel rendered image data by P-SPR detection operation 202. Selection operation 302, denoted as MUX1 in FIG. 9, selects GMA output color values or pre-subpixel rendered color values for storage in line buffers 404, based on the P-SPR detection flag 205 that identifies locations of the presubpixel rendered image color data.

Luminance value 408 of each output color from MUX1 302 proceeds along separate data path 403 so that one of the bits of luminance data 408, illustrated as data bit 406, or bit 0, in FIG. 9, is input to a P-SPR indicator storing operation 402, designated as MUX3 in FIG. 9, along with P-SPR detection flag 205. If pre-subpixel rendering processing is enabled in display 400 by P-SPR enable signal 209, then MUX3 402 will use bit 406 to flag those color data values that are part of pre-subpixel rendered image data 207 detected by P-SPR detection operation 202, before storing bit 406 in line buffers 404. If processing of pre-subpixel rendered data is disabled, then data bit 406 passes through MUX3 402 unaltered and luminance value L remains at full resolution. Utilizing 1 bit of the luminance value L in this manner eliminates the need for the one-bit line delay buffers shown in display system 300 illustrated in FIG. 8.

With continued reference to FIG. 9, line buffer output data, including the luminance bit 406 that carries P-SPR detection flag bit data, proceed along the two SPR and P-SPR data paths to complete processing of the two types of data. Line buffers 404 provide RGBW color data values and L data values to SPR operation 108 for subpixel rendering, and subpixel rendered data that is output from SPR operation 108 proceeds through output gamma operation 110. Line buffers 404 also provide RGBW color data values to color swap operation 204 on the P-SPR data path. Color swap operation 204 reverses the data swapping of color key values that took place in color swap operation 303, to prepare the P-SPR data for proper output to the display. Data output from Output gamma operation 110 and from color swap operation 204 proceed to select operation 306, denoted as MUX2 in FIG. 9. When the P-SPR function is enabled, as indicated by P-SPR enable signal 209, selection operation 306 selects between output gamma color values and P-SPR color values according to the value of luminance bit 406, which carries P-SPR detection flag data, to produce SPR output data 203.

FIG. 9 uses references to "luminance data (9:0)" along data path 403 and "Bit (9:1)" as input to line buffers 404, illustrating the use of 10 bits for representing luminance value L. It will be appreciated that indicating the number of bits used—in either the description or the accompanying figures—is offered by way of example only and is not intended to limit an implementation to any particular data set or specified bandwidth on any data path. All cases of different line buffer bit sizes may be accommodated in the implementation of display system 400. For example, it may be possible to have line buffer channels that are 12 bits wide and, in such an embodiment, the luminance value L would be reduced to 11 bits with one bit shared as the P-SPR detection flag.

The discussion now turns to implementations of display systems that handle the processing of conventional RGB image data with embedded pre-subpixel rendered image data along the standard SPR data path. In one such implementation, the processing of pre-subpixel rendered image data is handled by a modification to subpixel rendering (SPR) operation 108 as described below. In these implementations, color data values have not been swapped with color key data values in the embedded sub-pixel rendered image data, and so the combined RGB and embedded sub-pixel rendered image data take the form of input image data as shown, for example, by image data 600 of FIG. 6.

Figure 10:
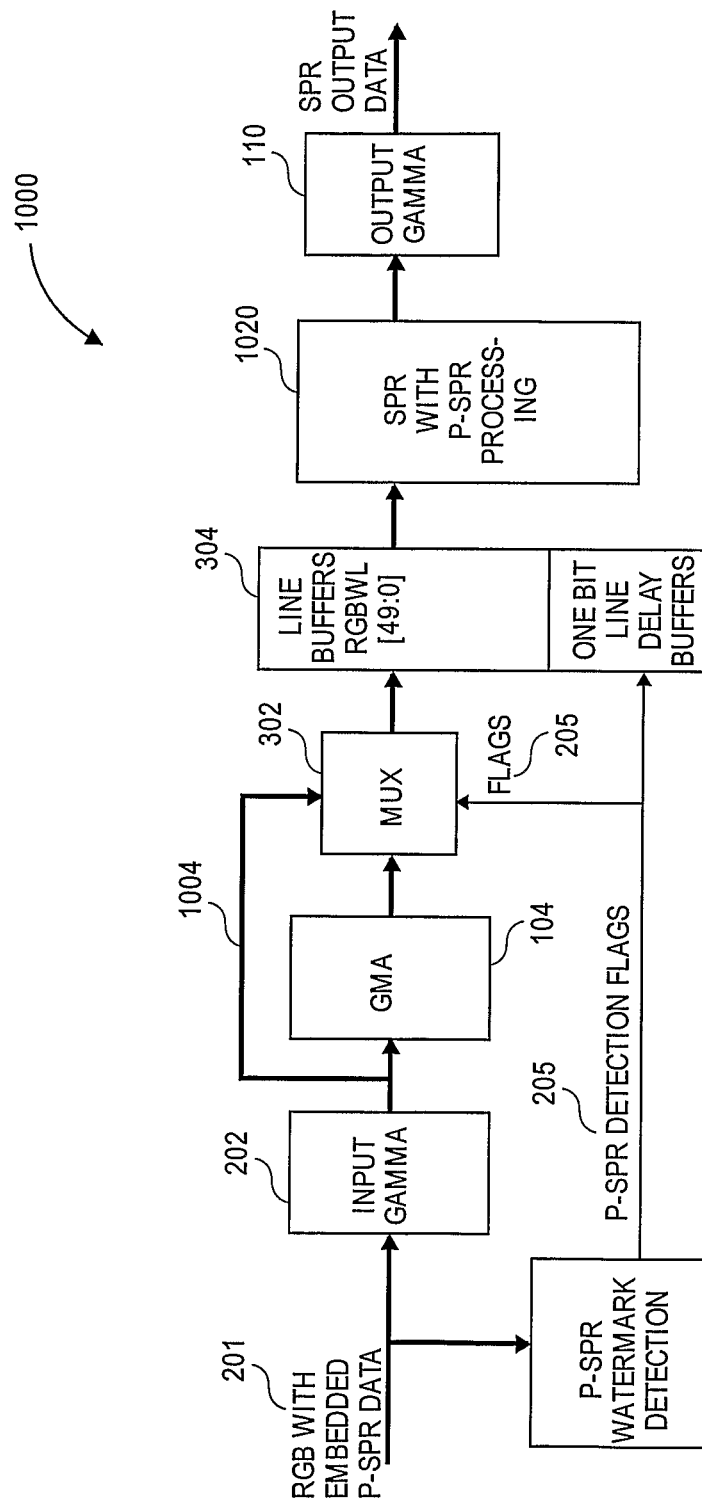
FIG. 10 is a block diagram of an embodiment of a display system in which pre-subpixel rendered image data is processed along a single data path using a modified Subpixel Rendering unit.

FIG. 10 illustrates display system 1000 which includes modifications to the SPR data path of display system 100 shown in FIG. 5 to handle input RGB data with embedded pre-subpixel rendered (P-SPR) data 201. As in previous embodiments described above, P-SPR detection operation 202 examines input image color data values to detect the color key, or other code, used to mark the portion of input data 201 that represents the pre-subpixel rendered image data and, for each image location, sets the value of P-SPR detection flag 205 to signal the presence or absence of pre-subpixel rendered image data. As also described in previous embodiments above, the hardware may need to delay input RGB values by several (e.g., three) input pixel line clocks past P-SPR detection operation 202 to keep the RGB values in phase with their detection flag bits; this delay is accomplished by the line delay buffers incorporated in line buffers 304. In contrast to previously described embodiments, P-SPR detection operation 202 does not show P-SPR data output to a color swapping operation, because this process is not necessary in this embodiment.

In display system 1000, all input color values, including P-SPR data values, are converted through input gamma operation 102. In an alternate embodiment (not shown) of display system 1000, the P-SPR data values are gated around the input and output gamma modules, and no gamma operation is applied to the P-SPR data values. This allows the designer of the P-SPR data to select the gamma of the image. Processing P-SPR data through input gamma module 102 and output gamma module 110, as described in display system 1000, allows the designer of the display to correct P-SPR data for the particular gamma of the display itself. Display system 1000 may be configured to include a switch to enable either embodiment.

With continued reference to FIG. 10, GMA operation 104 converts RGB data to the RGBW multi-primary format (W=white). It also calculates a luminosity value, L, for each pixel. In a display that also processes P-SPR data, the GMA calculation is unnecessary, and would produce incorrect values from P-SPR input. Thus, display system 1000 shows the P-SPR input values gated around the GMA module along data lines 1004 and includes selection operation 302 and line buffers 304, which operate in the manner described above with respect to display system 300 of FIG. 8 to select which data values for R, G and B should be passed to line buffers 304 according to the values for flags 205.

The RGBW and L data stored in line buffers 304 is then ready for subpixel rendering processing. As noted above, in display system 1000, both pre-subpixel rendered data and input RGB data that is to be subpixel rendered prior to output proceed along a single data path. Thus, the SPR operation must be able to accommodate P-SPR data in a manner that (1) does not alter the values of the P-SPR data and (2) ensures that only valid color values are input to the filtering operations performed during the SPR operation.

To understand the operation of SPR module 1020 of FIG. 10, a brief discussion of the operation of conventional SPR modules such as SPR module 108 shown in FIGS. 5-9 is first provided. A key process in subpixel rendering is the sampling, or filtering, operation that typically, but not necessarily, requires nine (9) color values input from three lines of RGB data. In software implementations this can be done with one or more intermediate frame buffers. Input values are read into frame buffers in whatever order they arrive, and then the SPR filtering operations randomly access the frame buffers to obtain necessary values. In conventional hardware implementations of SPR processing, nine (9) values are input from three lines of RGB data stored in line buffers 304 to do the SPR calculations. Note that in some implementations it may only be necessary for the line buffer to store two lines and a short section of the third line at one time.

Figure 11A:
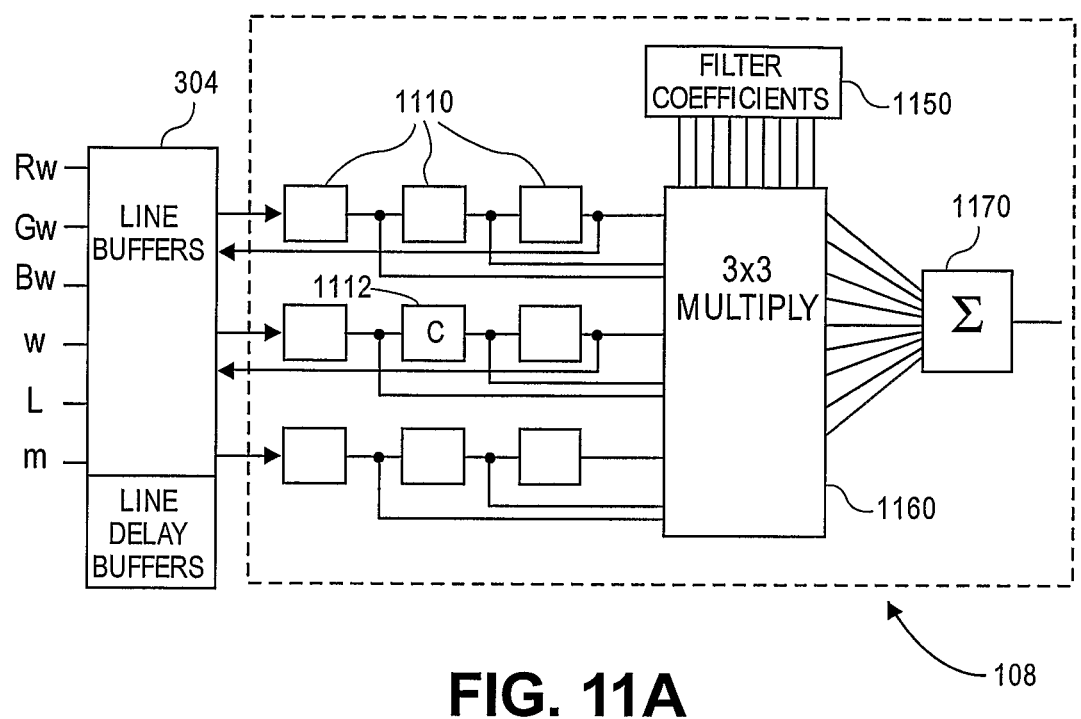
FIG. 11A is a block diagram illustrating a portion of the display system of FIG. 10 and showing a portion of the components of a subpixel rendering unit.

FIG. 11A is a simplified block diagram showing the line buffers and the inside of a conventional SPR module. In FIG. 11A, the line buffers are implemented as shift registers with the last few latches in each row separated out so they can be gated into 3×3 multiplier 1160. The color values of the last three pixels are cycled through line buffers 304 and appear in a set 1110 of nine (9) latches shown as three rows of rectangles in FIG. 11A in the order necessary for the next SPR operation. Note that reference numeral 1110 is intended to call out the nine latches as a set. Note also that center latch 1112 is labeled C and is discussed further below.

FIG. 11A is a simplified view of the inside of an SPR module because it shows only one set 1110 of nine latches. In a conventional SPR module, there is a separate set 1110 of nine latches for each primary color in the display (e.g., RGBW) and a set 1110 of nine latches for Luminance value L. The primary color values and L each may be 12 bits wide. P-SPR detection flag 205 is typically one bit wide and is also stored in line buffer 304 next to each set of primary values. For each primary color, there is a separate set of 3×3 multipliers 1160, potentially a separate set of 3×3 filter coefficients 1150, and if there are special filtering operations each of these may require yet another set of 3×3 multipliers and filter coefficients. There is also a summation unit 1170 for each set of 3×3 multipliers.

Note that in an alternative implementation, a small random access memory and pointers indicating the next locations to store or fetch values are used in place of line buffers 304 and the set 1110 of nine latches shown in FIG. 11A, or in place of a complete random access approach as would be used in a software implementation. This alternative implementation is more complex than using the complete random access intermediate frame buffer of a software implementation but requires less memory and fewer gates to implement. Additional information about subpixel rendering may be found in, for example, the '058 application referenced above, entitled "Methods and Systems for Sub-Pixel Rendering with Gamma Adjustment."

Figure 11B:
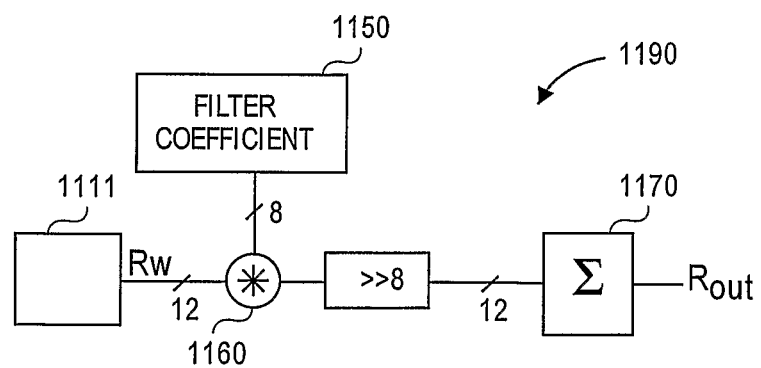
FIG. 11B illustrates the operation of one latch component of the subpixel rendering unit of FIG. 11A.

FIG. 11B illustrates the operation of a single latch 1111 that stores a single red primary value $R_W$, with a single filter coefficient 1150 and a single multiplier 1160, shown leading to summation unit 1170, collectively labeled as latch operation 1190. Note that up to 8 other similar multipliers also connect to summation unit 1170. In practice there are often less than 9 total latch/multipliers like the example shown in FIG. 11B because some of the coefficients in filter coefficients 1150 always have a zero value and so can be completely eliminated from the SPR module design. When the data value stored in the latches 1110 are 12 bits wide, and the filter coefficients are 8 bit fixed point binary numbers, the result of multiplication 1160 is 20 bits and must be reduced to 12 bits, for example, by shifting the result 8 bits as shown by the indication ">>8". Reducing the output to 12 bits may also be accomplished by rounding, by not wiring the lower 8 bits to the output, or by designing the multiplier not to produce these lower bits. In some implementations, the filter coefficients are known in advance and multiplier 1160 can be specially designed to produce the product with fewer gates than a full 12×8 bit multiplier. For example if the coefficient is 0.5 then the coefficient, multiplier and shifter could be replaced with a single right shift.

Figure 12:
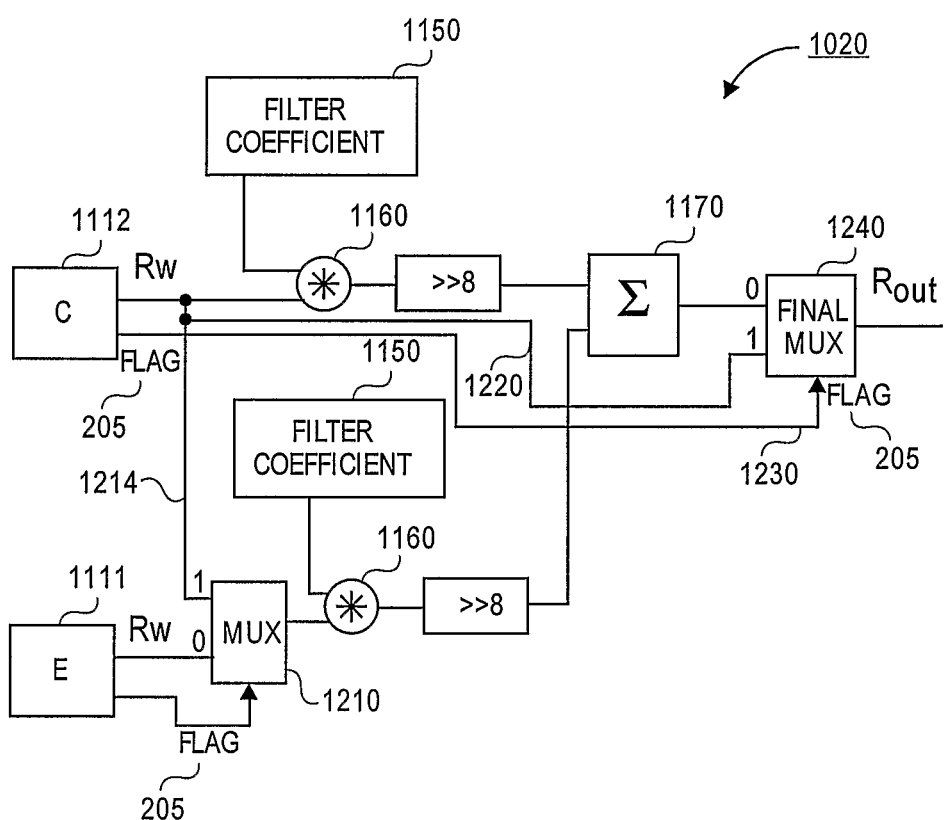
FIG. 12 is a block diagram of the modified Subpixel Rendering unit of FIG. 10 for processing pre-subpixel rendered image data.

FIG. 12 shows how latch operation 1190 of FIG. 11B is modified to accommodate the processing of P-SPR data within SPR operation 1020 (FIG. 10) without requiring a separate data path for the P-SPR data. FIG. 12 shows single latch 1111 that stores a single red primary value $R_W$, with a single filter coefficient 1150 and a single multiplier 1160, shown leading to summation unit 1170. Latch 1112 is labeled "C" to indicate that it stores a $R_W$ value for a center pixel being sampled in this SPR operation. Single latch 1111 is labeled "E" to indicate that the $R_W$ value being stored is a red data value belonging to an input pixel that is around, or at the edge, of the $R_W$ value stored in latch 1112. Four specific situations need to be accommodated: (1) neither center pixel C nor edge pixel E are part of P-SPR data; (2) both center pixel C and edge pixel E are part of P-SPR data; (3) center pixel C, but not edge pixel E, is part of P-SPR data; and (4) edge pixel E, but not center pixel C, is part of P-SPR data. This is because if any one of the edge pixels that are input to the filtering operation lies inside a P-SPR image area, the filtering operation will get incorrect results if processed by a conventional SPR module such as illustrated in FIGS. 11A and 11B.

With continued reference to FIG. 12, the value $R_W$ stored in latch 1112 for the center pixel proceeds through multiplier operation 1160 and summation unit 1170 and is input to final selection operation 1240, labeled "Final MUX" in the figure. At the same time, the value $R_W$ stored in latch 1112 for the center pixel is also input to final selection operation 1240, as shown by data line 1220 in FIG. 12, bypassing multiplier 1160 and summation unit 1170. Final selection operation 1240 selects between the original $R_W$ value or the color data value computed by multipliers 1160 and summation unit 1170 according to the value of P-SPR flag 205. When P-SPR flag 205 is "ON" (e.g., has a value of "1"), the original R, value of the center pixel is part of a P-SPR portion of the image and should be selected for output over the computed SPR color data value. When P-SPR flag 205 is "OFF" (e.g., has a value of "0"), the original $R_W$ value is not part of a P-SPR portion of the image and the computed SPR color data value output from summation unit 170 should be selected for output.

The value selected for output in Final MUX 1240 is influenced by whether the edge pixel stored in latch 1110 is included in the P-SPR image data in the following manner. Specific processing, in the form of selection operation 1210 is added along the data path between latch 1111 labeled "E" and its multiplier 1160 to test whether each edge pixel is part of a P-SPR area of the image, and, if so, to remove the data value from the SPR processing path (the multiplier and summation unit path.) The $R_W$ value stored in center latch 1112 is input, along data line 1214, to selection operation 1210 along with the edge pixel $R_x$ value stored in latch 1111.

Selection operation 1210 selects between the center $R_W$ value or the edge $R_W$ value according to the value of P-SPR flag 205 for the edge pixel $R_W$ value. When P-SPR flag 205 for the edge pixel $R_W$ value is "OFF" (e.g., has a value of "0"), the edge pixel $R_W$ value is not part of a P-SPR portion of the image and should proceed to multiplier 1160 and to summation unit 1170. However, when P-SPR flag 205 is "ON" (e.g., has a value of "1"), the edge pixel $R_W$ value is part of a P-SPR portion of the image and should not proceed to multiplier 1160 and summation unit 1170 as part of the SPR operation. In this case, selection operation 1210 selects the center $R_W$ value. This prevents the P-SPR value of the edge pixel from generating an incorrect filter result for the center $R_W$ value in the case when the center $R_W$ value is not part of the P-SPR image data and should be subpixel rendered. When both the center pixel and an edge pixel are determined to be P-SPR data, an invalid center value is latched into the edge pixel's multiplier producing an incorrect filter result, but final selection operation 1240 will cause this incorrect filter result to be ignored, and the correct output will still be produced. It can be seen, then, the embodiment of SPR operation 1020 illustrated in FIG. 12 produces correct filtering (SPR) results for all of the four situations described above; that is, when the center and edge pixels are all outside a P-SPR area, when the center and edge pixels are all inside a P-SPR area, and when any edge pixel in the sampling area is inside a P-SPR area.

While the above illustrated embodiments have been described in connection with particular functional units, operations or hardware, the description is not intended to limit a particular implementation, and these functional units and operations can be implemented using any combination of hardware and/or software, including components or modules such as one or more memory devices or circuitry. For example, a programmable gate array or like circuitry can be configured to implement such functional blocks. In other examples, a microprocessor operating a program in memory can also implement such functional blocks.

Pre-Subpixel Rendered Data Marking Guidelines and Embodiments

As noted above, pre-subpixel rendered image data may be marked with a digital signal or code that a subpixel rendering system and/or algorithm is capable of recognizing or decoding. Typically the code is added to, or embedded in, the P-SPR image data in a repeating pattern. Several factors may influence the selection of the particular code. As discussed in the '297 application, the marking code used may represent a color value, referred to herein as a color key. While a suitable color key could be any predetermined color value, some practical considerations may influence the color key selection. The color key may be a statistically unlikely color that is selected to avoid or minimize any distortion of the output image if the output image were to be rendered on a display that did not include a capability for detecting the pre-subpixel rendered image data. Color key values may be selected so that their binary values are the same for the most significant bits, in order to allow for the color key to undergo simple bit truncation while still being able to be detected. For example, the color key illustrated in several of the figures (red=65, green=27, blue=207) is a statistically unlikely color that may be particularly suited for use in 24 bit color systems (8 bits per color). This color may also be described as a "blue-screen" because color value (65, 27, 207) indicates a blue color that resembles one of the colors used in video and film processing.

It is also possible to use multiple color key values, in particular for red and blue, to mark P-SPR image data. A second (or multiple) set of colors may increase the complexity of the color key pattern, thus increasing its robustness and decreasing the likelihood of false positive detection. These second numbers are similar in color to the first color key values so that they produce an unlikely color, but are valued as being several steps away in the lowest bit depth, so that dither patterns may not cause false positive detection. Some exemplary color key values that are suitable to use to mark P-SPR image data are listed in Table 1 below. It is to be understood, however, that the color keys used in the figures and provided in Table 1 are for illustrative purposes only, and many other such color keys and marking codes may be used to mark P-SPR data.

TABLE 1

Exemplary P-SPR Image Data Marking Values

| Bit Depth | Red Value | Green Value | Blue Value | $2^{nd}$ Red | $2^{nd}$ Blue |
| --- | --- | --- | --- | --- | --- |
| 16 bit (5-6-5) | 01000 = 8 | 000110 = 6 | 11001 = 25 | 01010 = 10 | 11101 = 29 |
| 18 bit (6 per color) | 010000 = 16 | 000110 = 6 | 110011 = 51 | 010101 = 21 | 111010 = 58 |
| 24 bit (8 per color) | 01000001 = 65 | 00011011 = 27 | 11001111 = 207 | 01010101 = 85 | 11101010 = 234 |
| 30 bit (10 per color) | 0100000101 = 261 | 0001101101 = 109 | 1100111101 = 829 | 0101010101 = 341 | 1110101001 = 937 |

The color key or other marking code is overlaid, or interwoven with, the pre-subpixel rendered data. In general, the mapping of the marking code within the pre-subpixel rendered data values may be done according to any suitable marking pattern, and a P-SPR detection operation 202 would be appropriately programmed to decode the pre-subpixel rendered color data values from the marking code using the established marking pattern. However, the design and implementation of a general-use P-SPR detection operation 202 will benefit from principles or rules established to guide the process used to mark the P-SPR data with the digital signal or code. Examples of some principles for marking P-SPR data include the following. In the discussion hereafter, image input values are designated as starting in the upper left of an image at pixel (0, 0) such that a first row and column of pixels is each designated as the "zero" row and column and therefore an even row and column, and the second row and column is each designated as row and column one (1), and therefore an odd row and column.

- Marking values that appear in the zero row should appear offset by one pixel in a second (e.g., an odd) row of P-SPR pixels, establishing what is referred to below as a "phase offset." In FIG. 6, note by way of example that the placement of marking value "207" designated by reference numeral 616 in odd row 640 is offset one pixel from the placement of marking value "207" designated by reference numeral 604 in even row 630. A similar offset placement pattern can be seen in any one of the marked P-SPR image data sets illustrated in FIGS. 13B, 14B and 15B, and in the marking patterns illustrated in FIGS. 16B, 17A and 17B, 18B, 19B and 20B that use two marking codes.
- The marking values should appear in an n-pixel wide, m-pixel tall, repeated pattern, where n is typically an even number of input pixels and m is typically an even number of rows. For example, FIGS. 13B, 14B and 15B illustrate a 2-pixel wide repeating pattern of color key values and P-SPR data, while FIGS. 16B, 17A and 17B, 18B, 19B and 20B illustrate a 4-pixel wide repeating pattern of color key values and P-SPR data. In the above mentioned figures m is two, but other implementations are possible.
- The marking values should only appear in locations where they would be if the n-pixel-wide even/odd pattern were tiled across the entire display starting from pixel (0, 0) in the upper left of the image. The n-pixel wide pattern and the phase offset between even and odd lines helps to prevent false positive detections.
- A P-SPR portion of the image should start on an even input pixel, should include at least four pixels, and should be an even number of pixels wide. Figures herein that include P-SPR image data portions show the P-SPR image data starting on an even pixel and having an even number of pixels to reflect these guidelines.
- Marked P-SPR image data areas have no vertical restrictions: they can start on any line and be any number of lines tall. For purposes of P-SPR operation 202, a P-SPR image data area may be as small as four input pixels on one line.
- It is recommended that P-SPR image areas start and end in blank areas of the screen, for example between lines of text and between words. It is also reasonable to end a watermark area on a sharp discontinuity such as the edge of a picture as long as it meets the pixel start and count guidelines.

The placement of the color key marking code values within the P-SPR color data values may be influenced by the particular subpixel layout of the display. Several embodiments of subpixel layouts and examples of suitable marking patterns for marking P-SPR data are illustrated in FIGS. 13-20. Note that in these figures, pre-subpixel rendered image color values are shown as bolded and underlined (e.g., R, G B and W to distinguish the pre-subpixel rendered data from input image data that is to be input to a subpixel rendering operation prior to display. Note also that the positions of the marking code within the pre-subpixel rendered image data in these figures follows the guidelines listed above, but it is understood that other marking code guidelines and positioning are suitable for implementing the marking of pre-subpixel rendered image data.

Figure 13A:
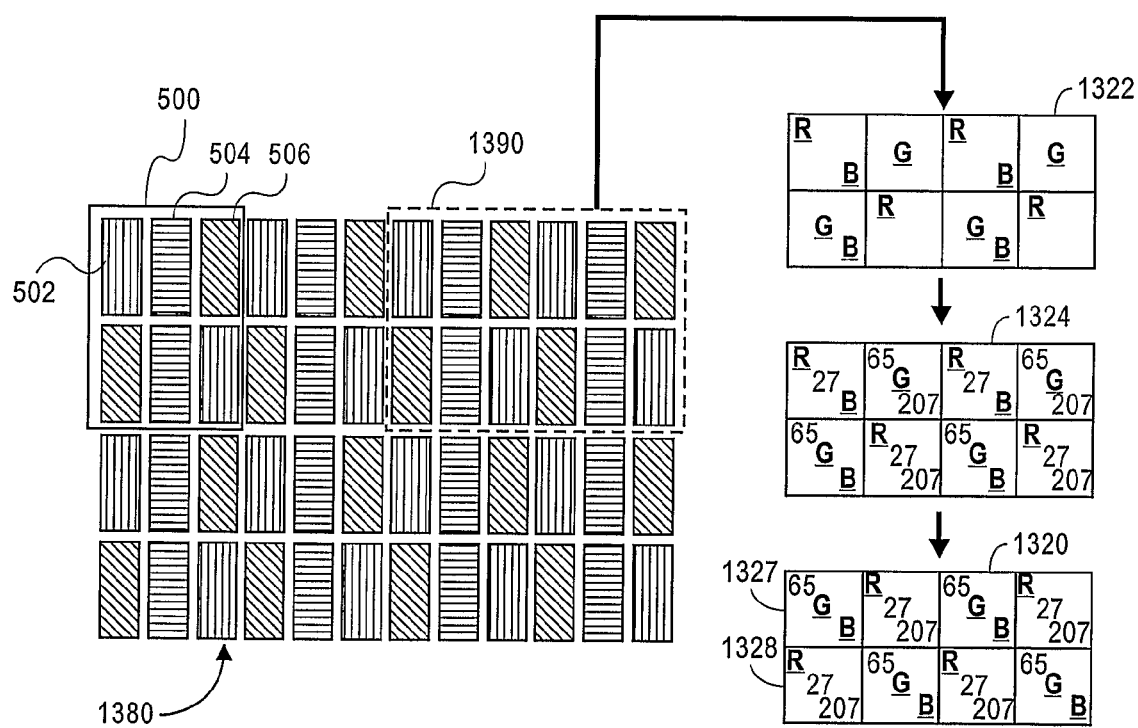
Figure 13B:
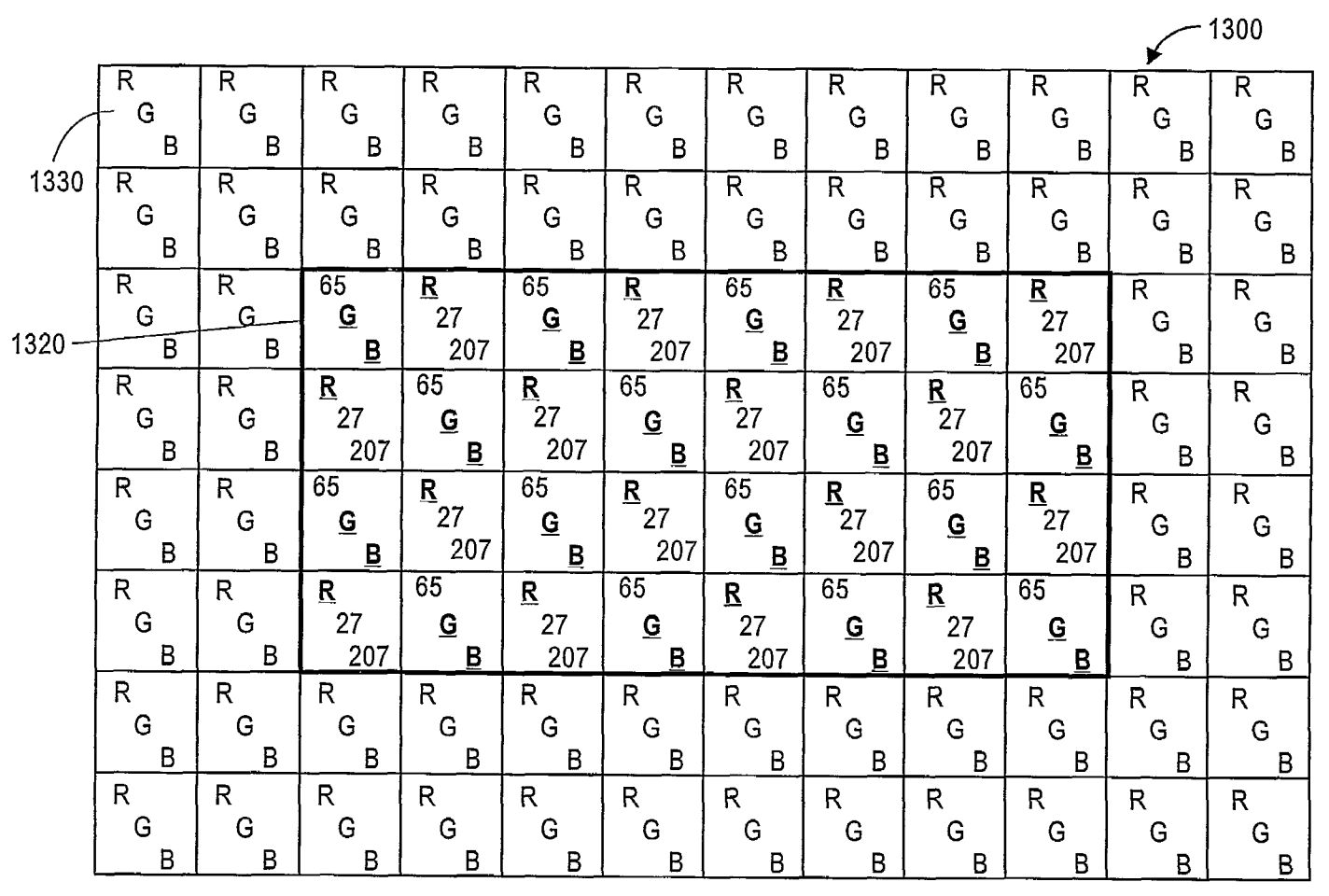

FIG. 13A depicts a first exemplary subpixel layout 1380 comprising repeating subpixel group 500. Subpixel group 500 is a 2 row by 3 subpixel pattern with red subpixels 502, blue subpixels 504, and green subpixels 506. Note that in all of the figures showing subpixel layouts, the same hatching patterns denote the same color assignments of red shown by vertical hatching, blue shown by horizontal hatching, green shown by diagonal hatching. Subpixels shown with no hatching, such as subpixel 508 in FIG. 14A, indicate white, grey or another color, such as yellow. FIG. 13B is an exemplary set of image data 1300 that contains pre-subpixel rendered image data 1320 that is arranged in a manner that accommodates subpixel layout 1380 and that includes a color key embedded therein. Because subpixel layout 1380 comprises a red/green checkerboard, red color data values are assigned to start at pixel (0, 0) in the upper left of the image, as designated by pixel 1330 in FIG. 13B, and embedded P-SPR image data values should follow the same color assignment.

With continued reference to FIG. 13A, eight pixel subset 1322 illustrates how pre-subpixel rendered image data are arranged according to subpixel layout portion 1390 of subpixel layout 1380, prior to being marked with a marking code. Eight pixel subset 1324 illustrates how pre-subpixel rendered image data are marked with a marking code in the form of color key (65, 27, 207); no color values have been exchanged in eight pixel subset 1324. Eight pixel subset 1320 illustrates how certain data values and color key values in eight pixel subset 1324 may be swapped, or exchanged, within the pre-subpixel rendered image data. In this case, in each horizontal pair of pixels, the R value has been exchanged with color key value "65" and the G values have been exchanged with color key value "27" because subpixel layout 1380 has a R/G checkerboard arrangement. Swapped data may be useful for some implementations of display systems that handle P-SPR data, for reasons explained above in conjunction with FIG. 6 and with the various display system embodiments of FIGS. 7, 8 and 9.

In addition to swapping the R and G values with their respective color key values, it may also be useful under certain conditions to swap the B values with their color key value. For example, it may be useful for purposes of subpixel rendering to simply swap all of the values between even and odd columns of data. Or it may be useful to swap some of the color values with their respective color key values for purposes of improving the display of the image on displays that do not process pre-subpixel rendered image data. FIG. 13B shows the B values in row 1328 exchanged with color key values "207" such that a valid B value appears in the same pixel with a valid G value, which may improve the image colors when the image is displayed on displays that do not process pre-subpixel rendered image data. Also, in this example, the swapping of the B values with color key values "207" complies with the guideline above that suggests that marking values that appear in the zero row 1327 should appear offset by one pixel in a second (e.g., an odd) row 1328 of P-SPR pixels. FIG. 13B shows presubpixel rendered data 1320 embedded within input image data that is to be subpixel rendered prior to display.

Figure 14A:
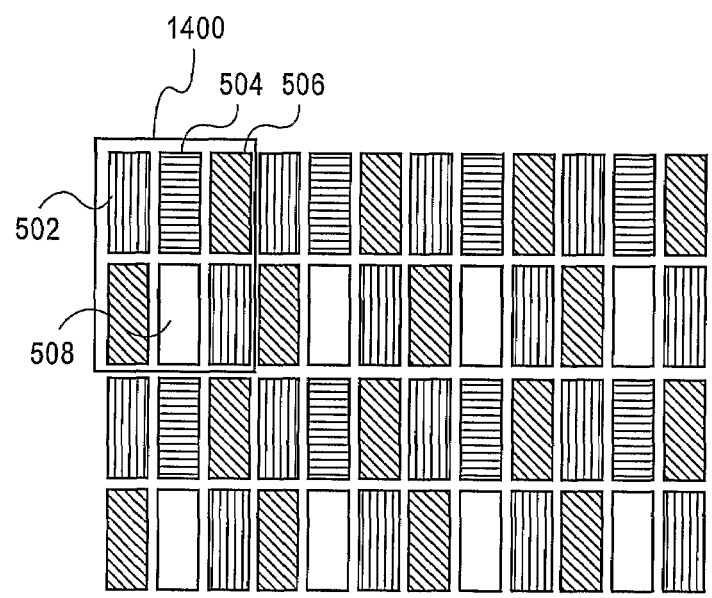
FIGS. 14A and 14B respectively illustrate a second subpixel layout and a schematic representation of an image data set including embedded pre-subpixel rendered image data marked with an embodiment of a suitable color key.
Figure 14B:
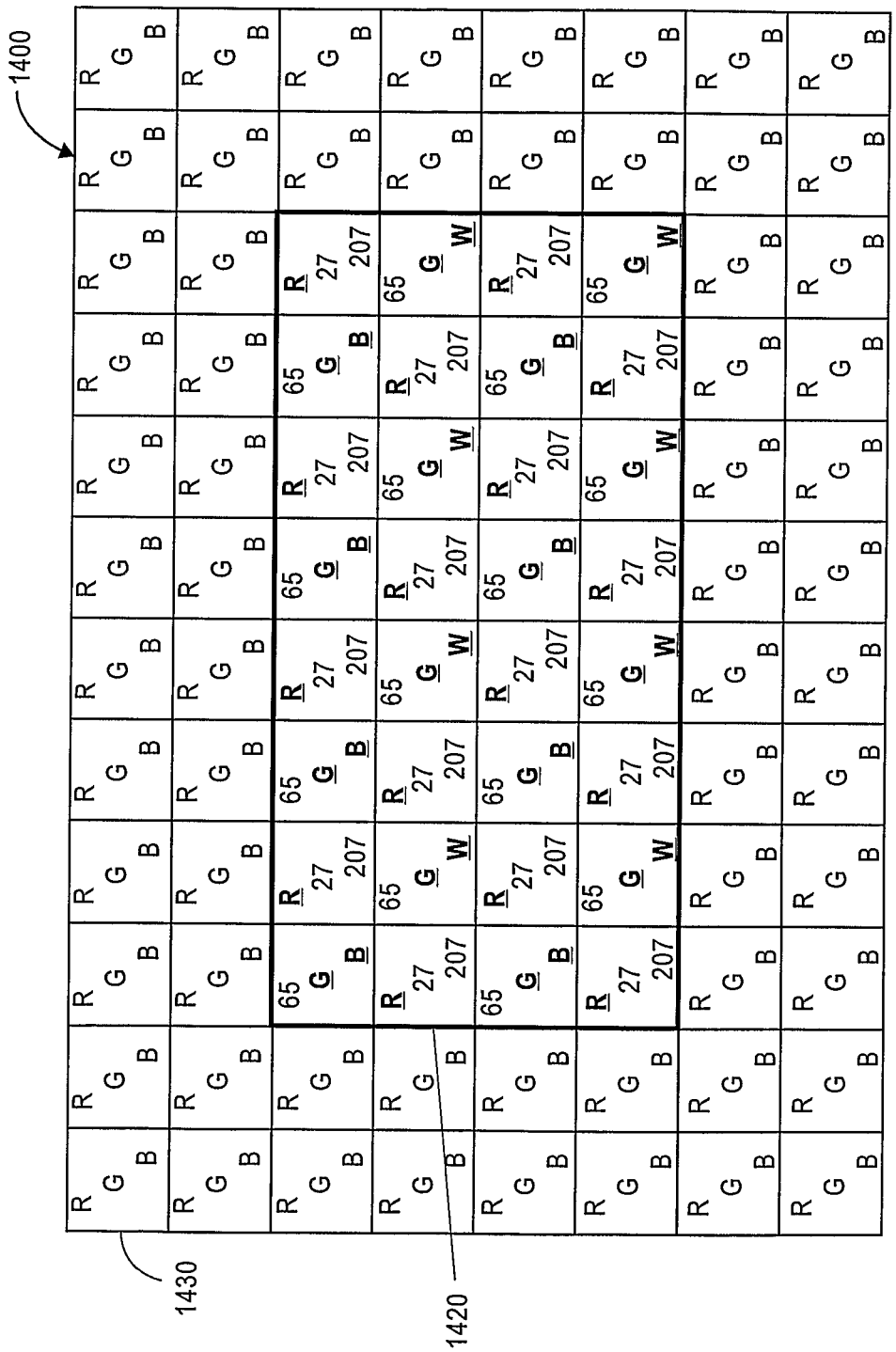

FIG. 14A illustrates a second subpixel layout showing repeating subpixel group 1400, which includes a fourth primary subpixel 508. FIG. 14B is a schematic representation of an image data set that includes embedded pre-subpixel rendered image data suitable for the subpixel layout in FIG. 14A and marked with an embodiment of a suitable color key, and with the red and green values exchanged, or swapped. In particular, pre-subpixel rendered image data have been marked with a marking code in the form of color key (65, 27, 207). In each horizontal pair of pixels, the R value has been exchanged with color key value "65" and the G values have been exchanged with color key value "27" because subpixel layout 1400 has a R/G checkerboard arrangement. Finally, a further exchange in the odd rows shows the W value exchanged with color key value "207."

Figure 15A:
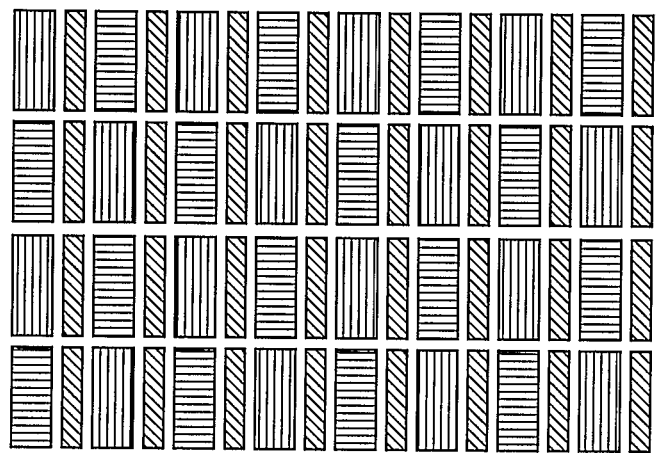
Figure 15B:
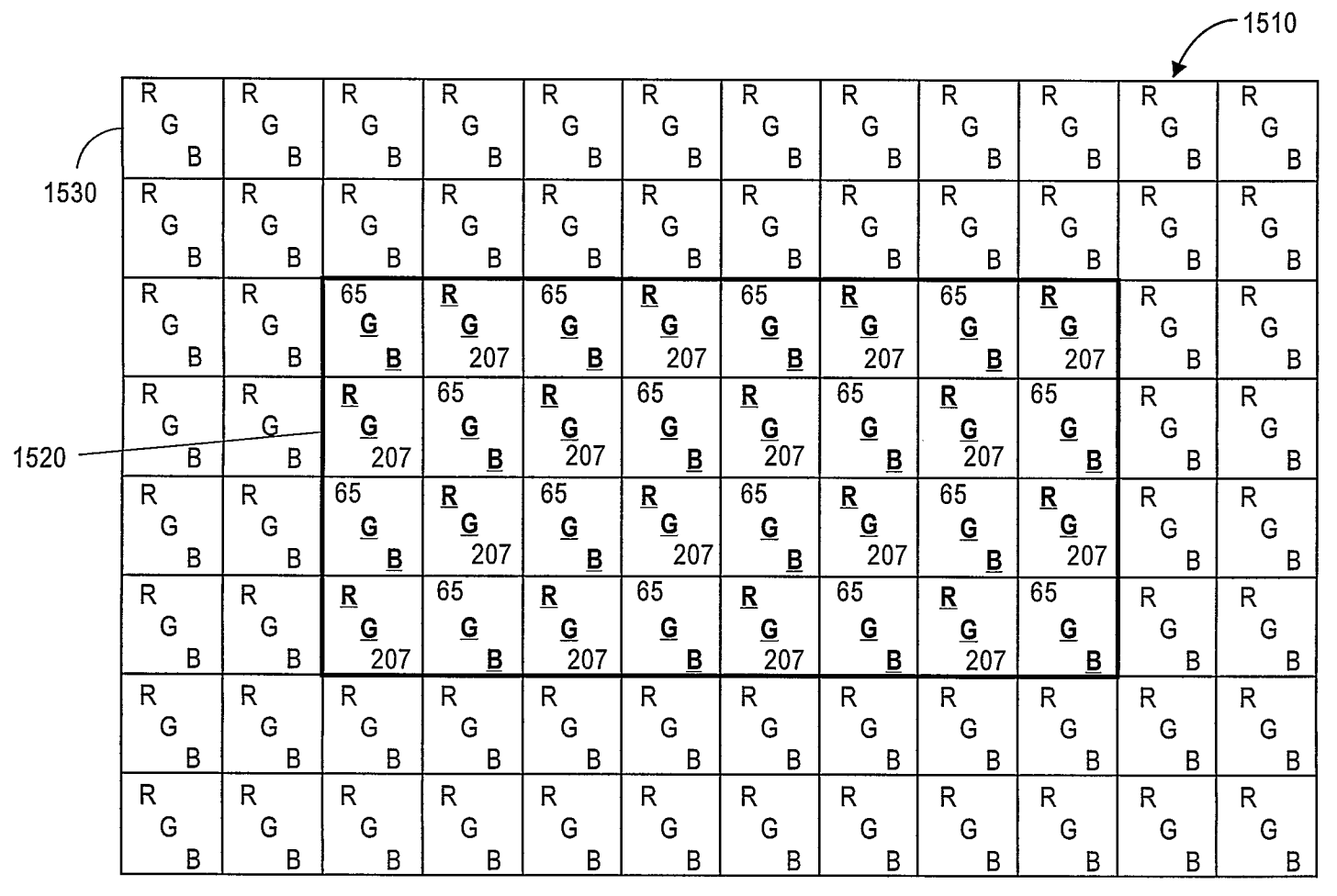

FIG. 15A illustrates a third subpixel layout that comprises a different ratio of green to red and blue than those described above and includes a red/blue checkerboard. It further comprises a square grid of green subpixels that maps one-pixel-to-one-green-subpixel. FIG. 15B illustrates a schematic representation of an image data set 1510 including embedded pre-subpixel rendered image data 1520 marked with a color key suitable for this subpixel layout. In particular, the red code is "65" and the blue code is "207" as before, but every green value is a valid pre-subpixel-rendered color value. Because this subpixel layout has a red/blue checkerboard, red color data values are assigned to start at pixel (0, 0) in the upper left of the image, as designated by pixel 1530 and the pre-subpixel rendered data 1520 are assumed to start with red (R) in the same manner. In this subpixel layout, the original order of the unmarked P-SPR data is (R G empty) (empty G B) in the zero row, where "empty" indicates a missing value, and (empty G B) (R G empty) in the first row. The red and blue data values are shown swapped with their respective color key values. However, for the subpixel layout of FIG. 15A, it is not necessary to swap the green values.

Figure 16A:
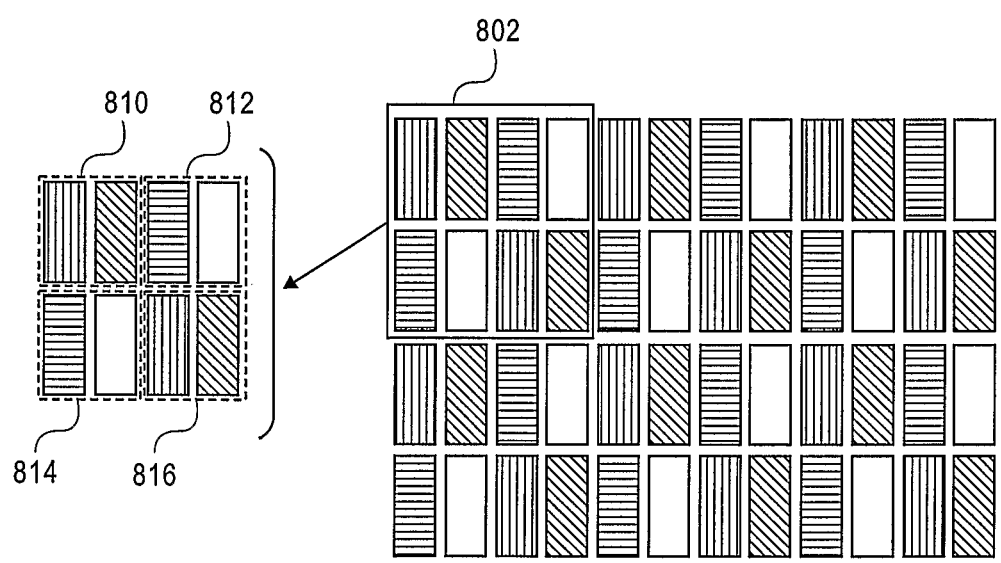
Figure 16B:
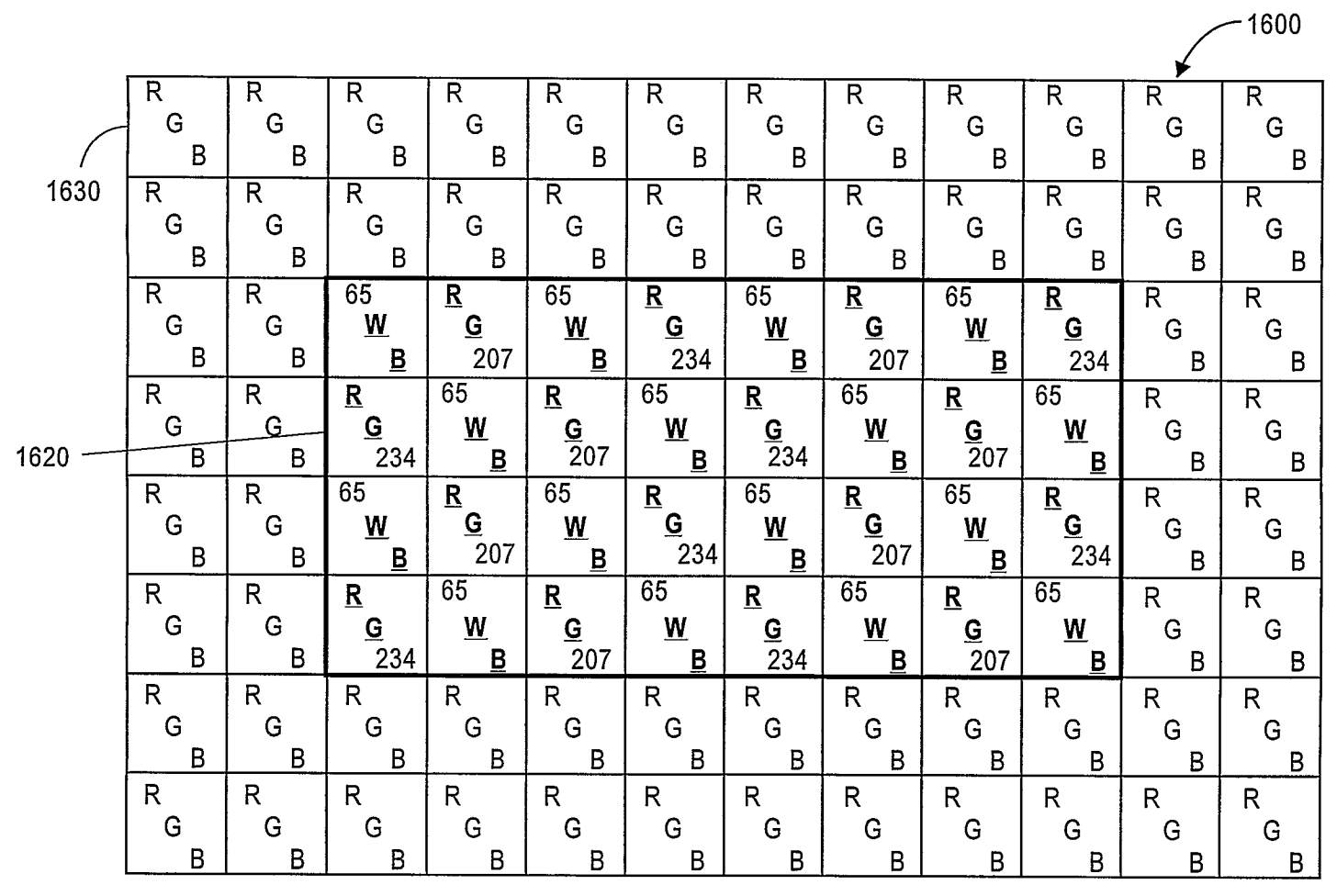

FIG. 16A illustrates a fourth subpixel layout including eight (8) subpixel repeating group 802 comprising red-green and blue-white subpixel pairs in a checkerboard pattern. While this subpixel layout may be described as having a blue-white subpixel pair, as noted above, subpixels shown with no hatching indicate white, grey or another color, such as yellow. FIG. 16B is a schematic representation of an image data set including embedded pre-subpixel rendered image data marked with a color key suitable for this subpixel layout. In particular, the red code is "65," every green value is a valid pre-subpixel-rendered value, and two blue codes (207, 234) are used in the marking pattern. The subpixel layout of FIG. 16A assumes that red color data values start at pixel (0, 0) in the upper left of the image. FIG. 16B shows the marked pre-subpixel rendered image data with swapped values. In this case all four values, red, green, blue, and white may be swapped.

Figures 17A, 17B, 18A, 18B:
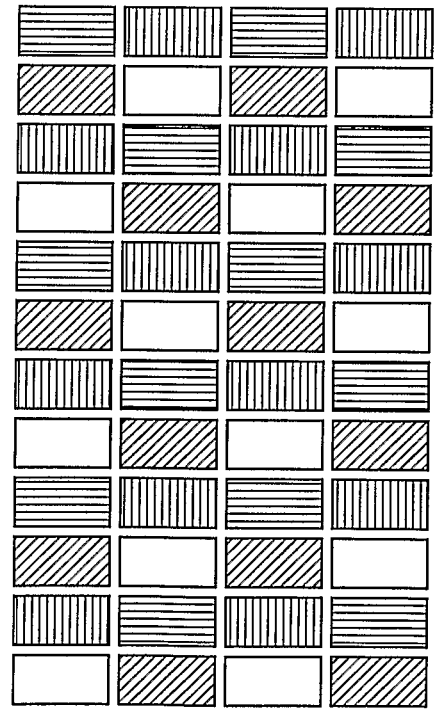
FIGS. 17A and 17B each illustrate a repeating group of embedded pre-subpixel rendered image data for the subpixel layout of FIG. 16A shown marked with second and third embodiments, respectively, of a suitable color key.
FIGS. 18A and 18B respectively illustrate a first variation of the fourth subpixel layout of FIG. 16A and suitably paired repeating group of embedded pre-subpixel rendered image data marked with an embodiment of a suitable color key.

FIGS. 17A and 17B show two alternative marking codes that may be used for marking the pre-subpixel rendered image data used in conjunction with the subpixel layout of FIG. 16A. In particular, in repeating group 1710 shown in FIG. 17A two red codes (65, 85) are used in the marking pattern. In FIG. 17B, two red codes (65, 85) and two blue codes (207, 234) are used in this marking pattern in which no data values have been swapped. This pattern results in storing each set of RGBW values in two RGB pixels with surrounding marking (e.g., color key) values. Note that W values are stored in place of G values in alternating pixels. The color key values can only appear in locations where they would be if the repeating pattern shown in FIG. 17B were tiled across the entire display starting from pixel (0, 0) in the upper left. The 4 pixel wide pattern and the phase offset between even and odd lines helps to prevent false positive detections.

There are several variations of the subpixel layout of FIG. 16A that may be implemented in display panels. FIGS. 18-20 illustrate examples of these variations as well as examples of suitable arrangements of pre-subpixel rendered data values and marking codes. FIG. 18A illustrates a first variation of the subpixel layout of FIG. 16A comprising white-blue and green-red subpixel pairs in a checkerboard pattern in place of the red-green and blue-white checkerboard in FIG. 16A; the subpixel layout of FIG. 18A is in effect, the mirror case. FIG. 18B shows the pre-subpixel rendered image data marked with two red color key values (65 and 85) and two blue color key values (207 and 234) and with swapped values. In this case all four values, red, green, blue, and white have been swapped.

FIG. 19A illustrates a second variation of the subpixel layout of FIG. 16A comprising green-red and white-blue subpixel pairs in a checkerboard pattern in place of the red-green and blue-white checkerboard in FIG. 16A; in effect, the subpixel layout of FIG. 19A is produced by rotating the subpixel layout of FIG. 16A by 180°. FIG. 19B shows a suitable arrangement of pre-subpixel rendered image data marked with two red color key values (65 and 85) and two blue color key values (207 and 234) and with swapped values. In this case all four values, red, green, blue, and white have been swapped.

FIG. 20A illustrates a third variation of the subpixel layout of FIG. 16A comprising blue-white and red-green subpixel pairs in a checkerboard pattern in place of the red-green and blue-white checkerboard in FIG. 16A. FIG. 20B shows eight-pixel repeating group 2010 with a suitable arrangement of pre-subpixel rendered image data marked with two red color key values (65 and 85) and two blue color key values (207 and 234) and with swapped values. In this case all four values, red, green, blue, and white have been swapped.

As noted above, the function of P-SPR detection operation 202 is to examine input image color data values to detect the color key, or other code, used to mark the portion of input data 201 that represents the pre-subpixel rendered (P-SPR) image data and, for each image location, to set the value of P-SPR detection flag 205 to signal the presence or absence of pre-subpixel rendered image data. In the case of P-SPR data that has been marked with two color keys, such as for example, as shown in eight pixel repeating group 2010 of FIG. 20B, the input image data includes triplets of some combination of RGBW color values, and the input P-SPR data also includes embedded red color key marking values (65 and 85) and blue color key marking values (207 and 234).

One technique for detecting the P-SPR data may include designating the input image data as starting at pixel (0, 0) at a first even row and even pixel, and expecting the P-SPR data to be located according to the guidelines described above: that is, to start within the input image data at an even row and even pixel location, to include two rows of pixels in the repeating group, and to position color key values in the odd rows at a phase offset from the even rows. FIG. 20B shows repeating group 2010 with even/odd row and pixel column designations.

Table 2 below provides pseudo-code for a simple row detector that detects the presence of the R and B marking codes shown in FIG. 20B. Subscript "c" indicates the column being tested, and, in each test, the "ELSE" condition reads "ELSE P-SPR FLAG=OFF" and is omitted from Table 2.

TABLE 2

| Pseudo Code Embodiment for P-SPR Detector | |
|---|---|
| EVEN ROWS | ODD ROWS |
| 1$^{ST}$ EVEN — If ($B_C$ = 207 and $R_{C+1}$ = 85 and $B_{C+2}$ = 234) OR | If ($R_C$ = 85 and $B_{C+1}$ = 234 and $R_{C+2}$ = 65) OR |

TABLE 2-continued

Pseudo Code Embodiment for P-SPR Detector

| | EVEN ROWS | ODD ROWS |
|---|---|---|
| PIXEL | ($B_{C-2}$ = 234 and $R_{C-1}$ = 65 and $B_C$ = 207) Then P-SPR FLAG = "ON". | ($R_{C-2}$ = 65 and $B_{C-1}$ = 207 and $R_C$ = 85) Then P-SPR FLAG = "ON". |
| $1^{ST}$ ODD PIXEL | If ($R_C$ = 85 and $B_{C+1}$ = 234 and $R_{C+2}$ = 65) OR ($R_{C-2}$ = 65 and $B_{C-1}$ = 207 and $R_C$ = 85) Then P-SPR FLAG = "ON". | If ($B_C$ = 234 and $R_{C+1}$ = 65 and $B_{C+2}$ = 207) OR ($B_{C-2}$ = 207 and $R_{C-1}$ = 85 and $B_C$ = 234) Then P-SPR FLAG = "ON". |
| $2^{ND}$ EVEN PIXEL | If ($B_C$ = 234 and $R_{C+1}$ = 65 and $B_{C+2}$ = 207) OR ($B_{C-2}$ = 207 and $R_{C-1}$ = 85 and $B_C$ = 234) Then P-SPR FLAG = "ON". | If ($R_C$ = 65 and $B_{C+1}$ = 207 and $R_{C+2}$ = 85) or ($R_{C-2}$ = 85 and $B_{C-1}$ = 234 and $R_C$ = 65) Then P-SPR FLAG = "ON". |
| $2^{ND}$ ODD PIXEL | If ($R_C$ = 65 and $B_{C+1}$ = 207 and $R_{C+2}$ = 85) or ($R_{C-2}$ = 85 and $B_{C-1}$ = 234 and $R_C$ = 65) Then P-SPR FLAG = "ON". | If ($B_C$ = 207 and $R_{C+1}$ = 85 and $B_{C+2}$ = 234) OR ($B_{C-2}$ = 234 and $R_{C-1}$ = 65 and $B_C$ = 207) Then P-SPR FLAG = "ON'". |

It can be seen that variations of the row detector illustrated in Table 2 may be implemented using the model shown for FIG. 20B for the marked P-SPR image data repeating groups in any of FIGS. 17A and 17B, 18B and 19B.

Pre-Subpixel Rendering and Enhanced Font Rendering

Efficient techniques such as those described herein for marking and detecting pre-subpixel rendered images support more widespread and advantageous uses of such images. The ability to embed a pres-subpixel rendered portion of an image, referred to as a P-SPR image subset, into an input image data file facilitates the high-quality rendering of image subsets that tend to be invariable, or fixed, from image to image. These fixed image subsets may be pre-subpixel rendered in advance using specialized techniques that otherwise may not be possible or easily accomplished with a particular subpixel rendering engine, and then stored for future use and/or transmitted to an operation that embeds the P-SPR image subset into input image data. Examples of fixed image subsets include a variety of graphical symbols such as logos, icons, ideograms and glyphs rendered in a specific font. The discussion that follows presents techniques for implementing the display of enhanced pre-subpixel rendered fonts, but it is understood that these techniques are applicable to any designated image subset that would benefit from being pre-subpixel rendered in advance of the remainder of the image data of which it is a part, for direct display.

User demand to view displayed text, in high quality, grayscale anti-aliased fonts will expand as electronic devices of all sizes function in new roles. For example, as more display of text occurs on small and low cost systems such as cell phones, users will expect to see higher quality text displayed than the one-bit-per-pixel fixed sized fonts that are in common use. As cell phone and other display device processors increase memory and processing power, producing text for display using outline fonts is likely to become commonplace on such devices. In this discussion, the term "font" denotes a complete typeface in a particular size (usually measured in points), one weight (e.g., light, book, bold, black), and one orientation or angle (e.g. roman, italic, oblique). The term "typeface," in typography, consists of a coordinated set of grapheme (i.e., character) designs. A typeface usually comprises an alphabet of letters, numerals, and punctuation marks, and may also include or consist of ideograms and symbols. An "outline font" is a font defined as a set of lines and curves, as opposed to a bitmap font. Generally, outline font characters can be scaled to any size and otherwise transformed more easily than a bitmap font, and with more attractive results. The result of transforming a character in an outline font in a particular way is often saved as a bitmap in a font cache to avoid repeating the calculations if that character is to be drawn again. A "glyph" as used herein is the realized instance in an image of a graphical symbol such as a character or symbol in a font.

Several embodiments of font-rendering techniques using pre-subpixel rendered image data are possible. In a first embodiment of a font rendering technique, each character in a font is pre-rendered using high-quality algorithms. The GMA, SPR, and output gamma operations, such as those illustrated and described above in any one of FIGS. 7, 8, 9 and 10, are all done at this time. The resulting glyph is marked with a marking code as a pre-subpixel rendered (P-SPR) image, either according to any of the marking code embodiments described above, or according to another suitable marking process. The marked P-SPR is stored as a bitmap that may be then directly displayed onto a display screen using well-known "blitting" or "bitblt" techniques that copy arrays of bits from memory to a display screen.

In one variation of this font-rendering technique, the characters in a font are generated on a font design workstation in a fixed size, then rendered using high-quality algorithms as described above, and stored as pre-subpixel rendered glyphs. In another variation of this font-rendering technique, when outline fonts are used, the font rendering engine may cache the glyphs in a pre-subpixel rendered format. In either of these variations, the pre-subpixel rendered glyphs may be stored with or without the marking code that marks them as pre-subpixel rendered images. Storing pre-subpixel rendered glyphs without the marking code, and adding the marking code to a pre-subpixel rendered glyph as it is being embedded in the image in which it will be displayed, may have advantages as discussed below.

As noted above, the operation of marking (i.e., adding a marking code to) P-SPR image data typically follows principles and guidelines to facilitate the detection of the marking code by a P-SPR detection operation such as P-SPR detection operation 202 in any of FIGS. 7, 8, 9 and 10. One such guideline states that a P-SPR image subset should start on an even input pixel and should be an even number of pixels wide. In addition, marking code values that appear in an even row of image input data typically appear offset by one pixel in a second (e.g., an odd) row of P-SPR pixels, establishing a phase offset. Thus, the marling code guidelines suggest that it may be desirable to start marked pre-subpixel rendered images on even logical pixel columns and rows, to use different marking codes on even and odd rows, or to include an even number of pixels.

In addition, a particular subpixel layout may influence the degrees of rendering freedom for glyphs in a font. Subpixel layouts, such as those illustrated in FIGS. 13A, 14A, 15A, 16A, 18A, 19A and 20A, and those farther disclosed in many of the co-owned patent applications that are incorporated by reference above, comprise subpixel repeating groups that may create logical pixels, each of which is mapped to a single RGB input pixel. Font glyphs may be designed to start at any of the logical pixel locations of the subpixel layout. Font characters may also be designed to be aligned at a sub-pixel resolution instead of a whole logical pixel. In this case, there may need to be as many different renditions of each glyph in the font as there are subpixels in the subpixel repeating group of a particular layout, and these pre-subpixel rendered glyph renditions would need to be stored. For text-intensive applications that require fonts in several sizes and typefaces, selection of a subpixel layout may affect the memory requirements of the display.

By way of example, examine the case of a display comprising a subpixel repeating group 802 as shown in FIG. 16A. This layout comprises 8 sub-pixels; however it may be desirable to group the sub-pixels into four quadrants 810, 812, 814 and 816 that are each mapped to a single RGB input pixel. Each quadrant 810 of two sub-pixels is referred to as a "logical pixel." Thus, as font glyphs are displayed, there are 4 different logical pixel locations in which each glyph may start. If font characters are designed to be aligned at a sub-pixel resolution instead of a whole logical pixel, then there might be 8 different renditions of each glyph in the font. As it turns out, the sub-pixel repeating group of FIG. 16A is particularly well suited for rendering fonts because the sub pixel rendering (SPR) filters may be substantially identical for all 4 RGBW primaries. This symmetry has the result that a font glyph pre-rendered for any of the 8 sub-pixel starting locations may be substantially identical. When they are all identical then storing multiple copies is unnecessary and significant savings in cost can be achieved. It is to be understood, however, that reference to subpixel repeating group 802 as shown in FIG. 16A is made by way of example only. The techniques for rendering enhanced font glyphs discussed herein may be applied in the context of any one of the many possible subpixel repeating groups which may comprise a display.

Marked pre-subpixel rendered font glyphs may be generated according to these guidelines to accommodate the design of a P-SPR detection operation 202. Rendering text images on a display, however, requires more flexibility in text placement than such guidelines may permit. Pre-rendered font glyphs may be rendered to start in several different phases and each such phase may have a different marking code pattern. Pre-rendered font glyphs may start on any logical pixel, even or odd, and may be an odd number of logical pixels wide. Methods and techniques are needed to provide additional degrees of freedom for the display of glyphs.

Figures 21A, 21B, 21C, 21D:
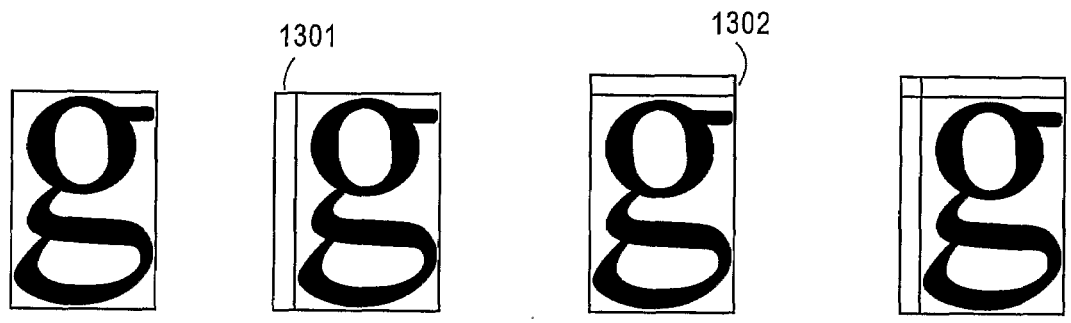
FIGS. 21A-21D illustrate an exemplary glyph represented by pre-subpixel rendered image data at four possible placements within marked pre-subpixel rendered image data and showing how marked pre-subpixel rendered image data may be added to the glyph representation to facilitate correct glyph placement on a display.

FIGS. 21A-21D illustrate some glyph alignment possibilities. FIG. 21A illustrates the case when the even/odd starting alignment of the font glyph in the image in which it will be displayed matches the even/odd alignment of the marking process. In this case, when the font character is pre-subpixel rendered and marked with a marking code, the resulting glyph is in compliance with the marking guidelines and may be embedded in a stream of input image data in which it will be displayed according to the expectations of a P-SPR detection operation. FIG. 21B illustrates a case where the marking code of the pre-subpixel rendered glyph starts on an even logical pixel column boundary and the glyph lands on an odd column boundary. In this case it may be desirable to store a copy of the glyph with an extra starting column 1301 of data. FIG. 21C illustrates the case where the marking code and glyph start locations land on different column start alignments and a copy of the font glyph with an extra line 1302 of data may be desirable. FIG. 21D illustrates the case where the starting alignment may require both a horizontal and vertical extra line. It may be desirable to store each font glyph four times in memory in all four alignments. The font display software would determine which case applied to each instance of a glyph and hand it off to simple hardware or software "bitblit" code to place it on the display.

Figure 22:
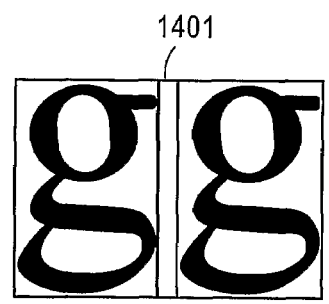
FIG. 22 illustrates two exemplary glyphs represented by pre-subpixel rendered image data in which extra spacing is inserted between the glyphs in the pre-subpixel rendered image data.

FIG. 22 shows the case where the P-SPR detection operation expects an even number of logical pixels but a font glyph is an odd number of logical pixels wide. An extra column 1401 of data could be included in the glyph to make the job easier for the bitblit code. FIG. 22 also shows how these extra columns of data after glyphs (or before glyphs as in FIGS. 21A-D) will introduce extra, seemingly random, spacing between the glyphs. This may detract from rendering high quality fonts. One solution to this problem may be to not store the extra columns or rows of data, referred to as the run-in and run-out bytes, and to require extra instructions in the font bitblit code to insert these bytes before and after every word or line of text to achieve the proper alignment. Another solution involves storing each pre-subpixel rendered font glyph only once, without the marking code. In this embodiment, the font storage is less, but the bitblit code must be more complicated because it adds the marking codes on the way to the display.

An enhanced font rendering system must provide more flexibility than black text on a white background. Modern graphics processors have "bitblit" modes that are able to replace the 1 and 0 bits of black and white text with foreground and background colors, resulting in the ability to display glyphs in any foreground color on top of any background color, and to display glyphs in an overlay mode on top of a background image instead of a solid background color.

Figure 23:
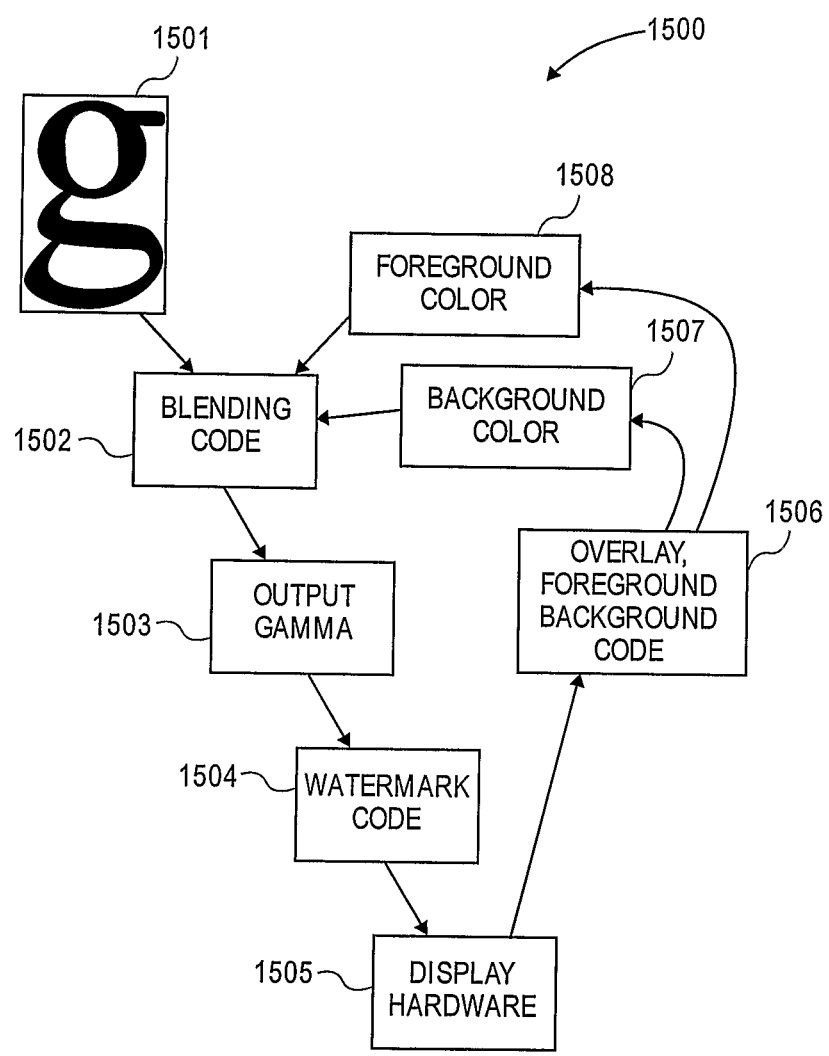
FIG. 23 is a flow diagram of a system and method for implementing the display of high quality, pre-subpixel rendered glyphs in a display system that accommodates rendering glyphs overlaid on images.

One embodiment, shown in FIG. 23, would provide a blending operation 1500 that could be implemented as part of the font display (e.g., bitblit") code in the display device. Pre-subpixel rendered font glyphs as represented by glyph 1501 would be stored as pre-rendered density maps. In a density map each pixel is not stored as a color but represents a percentage of mixing between a foreground color 1508 and a background color 1507. These density values are typically stored as 8 bit values with 255 representing an opaque foreground color and 0 representing an opaque background color. Other bit sizes and value representations are also possible. Values between 0 and 255 are used to calculate a color between an opaque foreground color and an opaque background color.

With continued reference to FIG. 23, blending code operation 1502 receives a signal to combine the foreground and background colors. In one embodiment, this could be accomplished with two 16-bit integer multiplies per subpixel, so as to process quickly on a device with a limited processor. The specific input color data values may be specified as part of the signal, or blending code operation 1502 may be operating in "overlay" mode, which is described in more detail below. It is desirable to carry out blending code operation 1502 in a linear color space, so the foreground and background colors are assumed to be specified in a linear color space. After blending, the linear color values are gamma corrected in output gamma operation 1503. Marking code operation 1504, referred to as "watermark code" in the figure, adds the marking codes to the data, taking even/odd glyph alignments into account, before sending the pixels to display hardware 1505, which could be implemented according to any of the display systems of FIGS. 7, 8, 9 and 10.

In most cases, the foreground font colors are completely black or full-on bright colors, and specifying these colors in a linear color space requires straightforward calculations. An input gamma curve is applied to those foreground font or background colors specified between full-off black and full-on bright colors, to produce their linear color space values. This calculation can be done once every time the foreground or background color changes and stored in modules 1507 and 1508 for use many times. The foreground and background colors also need to be specified in the color space of the output display. If the output display is a multi-primary display having RGBW or RGB plus another primary color, a Gamut Mapping (GMA) operation is performed on the foreground and background colors before storing them in modules 1507 and 1508. Thus, in a software implementation, overlay/foreground/background code operation 1506 may include the GMA and input gamma functionality that is normally contained in operations 102 and 104 of the SPR data path of any of the display systems of FIGS. 7, 8, 9 and 10.

Alternatively, overlay/foreground/background code operation 1506 may use hardware assistance to implement the GMA functionality, which removes the GMA computation burden from the processor of the device. One simple form of hardware help may derive from using optional frame buffer 308 in the display systems illustrated in FIGS. 8 and 9, or by adding a readable frame buffer at the output stage of display system 1000 of FIG. 10. In this implementation, overlay/foreground/background code operation 1506 in FIG. 23 writes patches of foreground color into the frame buffer without a marking code, for example, in areas off the screen or in image regions that are about to be overwritten. What has been referred to above as the SPR data path would perform the GMA operation on each foreground color, converting it to the color space of the display (e.g., RGBW or other multi-primary). Then overlay/foreground/background code operation 1506 would read the converted colors from the optional frame buffer. This implementation avoids duplicating GMA operation 104 in the software of module 1506.

If the font rendering system includes functionality to draw glyphs in "overlay" mode on top of existing images, then overlay/foreground/background code operation 1506 must include functionality to generate a background color value from a destination image region in a target output image to be displayed on the display device. In one implementation, operation 1506 determines the input background color value from the destination image region in the target output image by retrieving an input source image data subset from an input source image from which the target output image was produced. The input source image data subset corresponds to the destination image region in the target output image. Overlay/foreground/background code operation 1506 process the input source image data subset by performing the operations done by GMA operation 104 and Sub-Pixel Rendering operation 108 in the hardware to produce the input background color value which is sent to background color module 1507. In a second, alternate implementation, these pre-subpixel rendered background colors can be read directly from optional frame buffer 308 in the display systems illustrated in FIGS. 8 and 9.

Blending operation 1500 is particularly suited to low-cost devices, such as a cell phone or personal digital assistant (PDA), for rendering glyphs from fixed-size fonts stored as density map glyphs that were pre-subpixel rendered. The technique allows such devices to incorporate high quality fonts with a minimum of increase in computation. In systems that can support rendering variable-size fonts, the system's font rendering operation typically caches the rendered font glyphs as density glyphs. When this type of font rendering system is modified and/or enhanced to produce pre-subpixel rendered font glyphs in the cache, the discussion above of blending operation 1500 as applied to fixed-size fonts will also apply to rendering variable sized font glyphs from the cache.

It will be appreciated that the above methodologies and implementations are applicable to font rendering engines that reside on the image display device (e.g. a cell phone.) Examples of commercially available font rendering libraries may include Font Fusion® from Bitstream Inc., or Saffron® from MERL or the like. The outline font engines typically render into a cache of individual glyphs to increase their total throughput. The steps outlined above would be substantially the same if the glyph comes out of a pre-calculated font as described above or from a dynamically created glyph in the cache of a font rendering engine.

While the techniques and implementations have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. A display device having a display panel configured with a subpixel layout; the display device comprising:
    input circuitry for receiving input image data including image data that has not yet been subpixel rendered, as well as an image data subset of the input image data indicating a plurality of pre-subpixel rendered image data values in conformance with, and ready for display on, the subpixel layout of the display panel;
    a pre-subpixel rendering detection component for detecting an input image location of each of the plurality of pre-subpixel rendered image data values from among the image data that has not yet been subpixel rendered;
    a subpixel rendering component for performing a subpixel rendering operation on the input image data to produce subpixel rendered image data values in conformance with, and ready for display on, the subpixel layout of the display panel; and
    an output data selection component for selecting an output color data value for each output location on the display panel, the output data selection component selecting one of the subpixel rendered image data value and the pre-subpixel rendered image data value for each output location according to the input image locations detected by the pre-subpixel rendering detection component;
    wherein, after input to the display device, the input image data proceeds along a first image data path to the pre-subpixel rendering detection component and bypasses the subpixel rendering component, and the input image data proceeds along a second image data path to the subpixel rendering component and bypasses the pre-subpixel rendering detection component; and
    wherein the output data selection component is configured to receive the input image locations detected by the pre-subpixel rendering detection component from the first image data path, and to receive the subpixel rendered image data values from the second image data path.

2. The display device of claim 1 wherein the subpixel rendering component includes a color selection component for removing a color value from input to the subpixel rendering operation when the color value is detected to be in an input image location indicating a pre-subpixel rendered image data value by the pre-subpixel rendering detection component.

3. The display device of claim 2 wherein the output data selection component for selecting an output color data value for each output location on the display panel is included in the subpixel rendering component.

4. The display device of claim 1 wherein the first image data path includes a line delay buffer for storing the input image locations detected by the pre-subpixel rendering detection component.

5. The display device of claim 1 further including a shared line buffer for storing the input image data proceeding along the second image data path to the subpixel rendering component and the input image locations detected by the pre-subpixel rendering detection component along the first data path.

6. The display device of claim 1 further including
a gamut mapping component for performing a gamut mapping operation on the input image data to produce gamut-mapped image data values for input to the subpixel rendering component; and
a gamut data selection component for selecting a gamut-mapped color data value for each input image location;
the gamut data selection component selecting, for input to the subpixel rendering component, one of the gamut-mapped image data value and the pre-subpixel rendered image data value according to the input image locations detected by the pre-subpixel rendering detection component.

7. The display device of claim 6 wherein each gamut-mapped image data value produced by the gamut mapping operation includes a luminosity value;
wherein the display device further includes a p-spr indicator storing component for storing a p-spr indicator value in a portion of the luminosity value for the gamut-mapped image data value for an input image location when the pre-subpixel rendering detection component determines that a pre-subpixel rendered image data value is present in the input image location; and
wherein the output data selection component selects one of the subpixel rendered image data value and the pre-subpixel rendered image data value according to the p-spr indicator value.

8. The display device of claim 1 wherein the pre-subpixel rendering detection component is configured to detect a marking code embedded in the input image data to determine whether a pre-subpixel rendered image data value is present in an input image location.

9. The display device of claim 8 wherein the marking code is embedded in the image data subset and marks the extent of the input image locations indicating the pre-subpixel rendered image data values.

10. The display device of claim 8 wherein the input image data includes color data values indicating at least first, second and third primary colors; and wherein the marking code is a color key code comprising at least one color value in the first primary color and at least one color value in the second primary color.

11. The display device of claim 9 wherein the marking code is a color key code comprising at least two color values in the first primary color.

12. A display device having a display panel configured with a subpixel layout; the display device comprising:
input circuitry for receiving input image data including image data that has not yet been subpixel rendered, as well as an image data subset data subset of the input image data indicating a plurality of pre-subpixel rendered image data values in conformance with, and ready for display on, the subpixel layout of the display panel;
a pre-subpixel rendering detection component for detecting an input image location of each of the plurality of pre-subpixel rendered image data values from among the image data that has not yet been subpixel rendered, the pre-subpixel rendering detection component configured to set a p-spr data variable for each input image location indicating whether the input image location is a pre-subpixel rendered image data value;
a gamut mapping component for performing a gamut mapping operation on the input image data to produce gamut-mapped image data values;
a subpixel rendering component for receiving the gamut-mapped image data values and for performing a subpixel rendering operation on the gamut-mapped image data values for the image data to produce subpixel rendered image data values in conformance with, and ready for display on, the subpixel layout of the display panel;
a memory component for buffering the gamut-mapped image data values for input to the subpixel rendering component;
an output data selection component for selecting an output color data value for each output location on the display panel; the output data selection component configured to select one of the subpixel rendered image data value and the pre-subpixel rendered image data value for each output location according to the value of the p-spr data variable for each input image location; and
a line delay buffer for storing the p-spr data variables for each input image location prior to input to the output data selection component;
wherein, after input to the display device, the input image data proceeds along a first image data path to the pre-subpixel rendering detection component and bypasses the subpixel rendering component, and the input image data proceeds along a second image data path to the subpixel rendering component and bypasses the pre-subpixel rendering detection component; and
wherein the output data selection component is configured to receive the input image locations detected by the pre-subpixel rendering detection component from the first image data path, and to receive the subpixel rendered image data values from the second image data path.

13. The display device of claim 12 further including a gamut data selection component for selecting a gamut-mapped color data value for each input image location; the gamut data selection component selecting, for input to the subpixel rendering component, one of the gamut-mapped image data value and the pre-subpixel rendered image data value according to the p-spr data variables for each input image location.

14. The display device of claim 12 wherein the memory component and the line delay buffer share a common memory component.

15. The display device of claim 12 wherein the input image data further comprises a second image data subset comprising a marking code embedded in the plurality of pre-subpixel rendered image data values for identifying the pre-subpixel rendered image data values;
wherein selected ones of the of pre-subpixel rendered image data values have been swapped from original positions with data values included in the marking code to swapped positions in the input image data; and
wherein the display device further includes a data swapping component for swapping the selected ones of the of pre-subpixel rendered image data values with data values included in the marking code from swapped positions in the input image data to the original positions prior to input to the output data selection component for selecting an output color data value.

16. The display device of claim 12 further including first and second data swapping components; the first data swapping component configured for swapping selected ones of the pre- subpixel rendered image data values from original positions in the image data subset with data values included in the marking code to swapped positions in the image data subset; the second data swapping component configured for swapping the selected ones of the of pre-subpixel rendered image data values with data values included in the marking code from swapped positions in the input image data to the original positions prior to input to the output data selection component for selecting an output color data value.

17. A display system comprising an input gamma component, a subpixel rendering processor, and an output gamma component, the display system further comprising:
- a pre-subpixel rendering detection component configured to accept input image data having pre-subpixel rendered image data and image data that has not yet been subpixel rendered, and to detect a pre-subpixel rendering code indicating the pre-subpixel rendered image data;
- wherein the pre-subpixel rendered image data is data processed separately from the input gamma component;
- wherein, after input to the display system, the input image data proceeds along a first image data path to the pre-subpixel rendering detection component and bypasses the subpixel rendering processor, and the input image data proceeds along a second image data path to the subpixel rendering processor and bypasses the pre-subpixel rendering detection component; and
- an output data selection component for selecting an output data value for each output location in the display system; the output data selection component configured to select one of a subpixel rendered image data value output from the subpixel rendering processor and a pre-subpixel rendered image data value according to the detected pre-subpixel rendering code by the pre-subpixel rendering detection component.

18. The display system of claim 17 further comprising a multiplexor configured to select among a set of processed image data, the set of processed image data including the pre-subpixel rendered image data and image data which is subpixel rendered by the display system.

19. The display system of claim 17 further comprising a color swapping unit configured to swap color image data in the pre-subpixel rendered image data.

20. The display system of claim 17 wherein the pre-subpixel image data comprises a code that differentiates the pre-subpixel rendered image data from the image data that has not yet been subpixel rendered.

21. A display system comprising:
- a pre-subpixel rendering detection component configured to accept input image data proceeding along a first image data path to the pre-subpixel rendering detection component, the input image data having pre-subpixel rendered image data and image data that has not yet been subpixel rendered, and wherein the pre-subpixel rendering detection component is configured to detect a pre-subpixel rendering code indicating a portion of the input image data indicating the pre-subpixel rendered image data;
- a subpixel rendering processor for subpixel rendering the input image data along a second image data path; and
- a color swapping component for swapping color image data included in the pre-subpixel rendered image data proceeding along the first image data path;
- a multiplexer configured to multiplex processed image data in the first and the second image data paths for output depending upon whether the pre-subpixel rendering code is present or absent, wherein an output data value for each output location in the display system is selected from one of a subpixel rendered image data value output from the subpixel rendering processor and a pre-subpixel rendered image data value according to the detected pre-subpixel rendering code by the pre-subpixel rendering detection component; and
- wherein, after input to the display system, the input image data proceeds along the first image data path to the pre-subpixel rendering detection component and bypasses the subpixel rendering processor, and the input image data proceeds along the second image data path to the subpixel rendering processor and bypasses the pre-subpixel rendering detection component.

22. The display system of claim 21 further comprising a line buffer capable of storing image data from the first and the second image data paths.

23. The display system of claim 22 wherein the line buffer is further configured to store a code output by the pre-subpixel rendering detection component differentiating between the pre-subpixel rendered image data and the image data that has not yet been subpixel rendered.

24. The display system of claim 21 wherein the pre-subpixel rendering detection component is configured to detect the pre-subpixel rendering code in the input image data in input row order, one row at a time.

25. The display device of claim 1, wherein the pre-subpixel rendered image data values comprise luminance data values comprising a plurality of bits of luminance data, and the display device is configured to use at least one of said bits of luminance data to store a detection flag which identifies the pre-subpixel rendered image data values.

26. The display device of claim 12, wherein the pre-subpixel rendered image data values comprise luminance data values comprising a plurality of bits of luminance data, and the display device is configured to use at least one of said bits of luminance data to store a detection flag which identifies the pre-subpixel rendered image data values.

27. The display system of claim 17, wherein the pre-subpixel rendered image data comprises luminance data values comprising a plurality of bits of luminance data, and the system is configured to use at least one of said bits of luminance data to store the pre-subpixel rendering code.

28. The display system of claim 21, wherein the pre-subpixel rendered image data comprises luminance data values comprising a plurality of bits of luminance data, and the system is configured to use at least one of said bits of luminance data to store the pre-subpixel rendering code.

* * * * *